(12) United States Patent
Nakao et al.

(10) Patent No.: US 7,597,627 B2
(45) Date of Patent: Oct. 6, 2009

(54) CONSTANT VELOCITY JOINT AND METHOD OF MANUFACTURING THE SAME

(75) Inventors: Shouichi Nakao, Utsunomiya (JP); Tsutomu Kawakatsu, Utsunomiya (JP); Masanori Kosugi, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 320 days.

(21) Appl. No.: 10/579,673

(22) PCT Filed: Jul. 28, 2004

(86) PCT No.: PCT/JP2004/010737

§ 371 (c)(1),
(2), (4) Date: May 18, 2006

(87) PCT Pub. No.: WO2005/050043

PCT Pub. Date: Jun. 2, 2005

(65) Prior Publication Data
US 2007/0105633 A1    May 10, 2007

(30) Foreign Application Priority Data
Nov. 18, 2003   (JP)   ............................. 2003-388029
Nov. 18, 2003   (JP)   ............................. 2003-388058
Jun. 29, 2004   (JP)   ............................. 2004-191535

(51) Int. Cl.
*F16D 3/205*    (2006.01)
(52) U.S. Cl. ........................ 464/111; 464/132; 29/434
(58) Field of Classification Search ................ 464/111, 464/132, 905; 29/434
See application file for complete search history.

(56) References Cited

U.S. PATENT DOCUMENTS 5,989,124 A    11/1999   Goto et al.

FOREIGN PATENT DOCUMENTS

| EP | 1 008 777 A2 | 6/2000 |
| GB | 2259 557 A | 3/1993 |
| JP | 5-296255 | 11/1993 |
| JP | 10-184717 | 7/1998 |
| JP | 2001-208090 | 8/2001 |

OTHER PUBLICATIONS

Malaysian Search Report for 04771000.9—1523 dated Jul. 30, 2007.
European Search Report for 04771000.9—1523 dated Jul. 30, 2007.

*Primary Examiner*—Greg Binda
(74) *Attorney, Agent, or Firm*—Squire, Sanders & Dempsey L.L.P.

(57) ABSTRACT

A constant velocity joint, wherein all rolling elements annularly held by a tool are inserted into an inner diameter part from one end opposite to the flange part of a roller member along the axis of the inner diameter part of the roller member or the rolling elements remaining after one rolling element is removed from all rolling elements are charged into the inner diameter part and the removed one rolling element is inserted into a clearance between the rolling elements from the other end along the axis of the inner diameter part. After all rolling elements are fitted into the inner diameter part of the rolling member, a snap ring is fitted into an annular groove formed at the end part of the inner diameter part on the opposite side of the flange part to hold the rolling elements between the flange part and the snap ring.

8 Claims, 27 Drawing Sheets d2 < d1

*Prior Art*

CONSTANT VELOCITY JOINT AND METHOD OF MANUFACTURING THE SAME

TECHNICAL FIELD

The present invention relates to a constant velocity joint for connecting a transmission shaft to another transmission shaft in an automotive driveline, for example, and a method of manufacturing such a constant velocity joint.

BACKGROUND ART

Heretofore, automotive drivelines employ a constant velocity joint for connecting a transmission shaft to another transmission shaft and transmitting rotational power to the axles.

One conventional constant velocity joint, whose technical concept is disclosed in Japanese Laid-Open Patent Publication No. 10-184717, has, as shown in FIG. 27 of the accompanying drawings, a roller 1 having a cylindrical inner circumferential wall surface 2 and a pair of flanges mounted on the respective axial ends of the cylindrical inner circumferential wall surface 2 for preventing rolling elements 3 (rolls, needles, or the like) from being dislodged. The constant velocity joint is assembled as follows: A plurality of rolling elements 3, whose number is one less than all of the rolling elements 3 to be finally mounted, is arrayed between the flanges on the cylindrical inner circumferential wall surface 2. The dimensions of the cylindrical inner circumferential wall surface 2 and the rolling elements 3 are selected such that the minimum distance d2 between two rolling elements 3 on the ends of the array is smaller than the diameter d1 of a rolling element 3a which is to be added finally between those two rolling elements 3 (d2<d1). The difference between the distance d2 and the diameter d1 serves as an interference ranging from several μm to several tens of μm. Then, the final rolling element 3a is pressed in between the two rolling elements 3 radially toward the cylindrical inner circumferential wall surface 2, thus installing the rolling elements 3 on the cylindrical inner circumferential wall surface 2.

The above process of arraying the rolling elements 3 along the cylindrical inner circumferential wall surface 2 of the roller 1 is referred to as a keystone process. The keystone process allows the roller 1 and the rolling elements 3 to be integrally combined as an inseparable assembly, which is assembled on an unillustrated leg shaft.

According to the assembling process disclosed in Japanese Laid-Open Patent Publication No. 10-184717, the interference needs to be provided for the final rolling element 3a to be pressed into the gap between the two rolling elements 3 for the purpose of achieving the keystone effect. To provide the interference, the inside diameter tolerance of the cylindrical inner circumferential wall surface 2 of the roller 1 and the outside diameter tolerances of the rolling elements 3, 3a have to be as small as possible.

If the above tolerances, i.e., the inside diameter tolerance and the outside diameter tolerances, are relatively large, then the interference may be eliminated, making the final rolling element 3a loose between the two rolling elements 3, or the interference may become so large that the final rolling element 3a cannot be pressed in between the two rolling elements 3 or, even if the final rolling element 3a can be pressed in between the two rolling elements 3, the rolling elements 3, 3a may be unduly deformed. Efforts to make the tolerances smaller result in difficulties machining the cylindrical inner circumferential wall surface 2 of the roller 1 and the rolling elements 3, 3a and an increase in the manufacturing cost.

Furthermore, because of the need to press the final rolling elements 3a into the gap between the two rolling elements 3, the processing of assembling the roller 1 and the rolling elements 3, 3a into a roller unit is not easy to perform and is highly costly.

DISCLOSURE OF THE INVENTION

Problems to be Solved by the Invention

It is a general object of the present invention to provide a constant velocity joint which keeps a plurality of rolling elements held against the inner circumferential wall surface of a roller based on the keystone effect, and allows the rolling elements to be assembled easily and efficiently in the roller for a reduced manufacturing cost without being affected by outside diameter tolerances of the rolling elements and an inside diameter tolerance of the roller, and a method of manufacturing such a constant velocity joint.

Another object of the present invention is to provide a constant velocity joint which allows a holder to be assembled in a roller easily and efficiently for a reduced manufacturing cost, and a method of manufacturing such a constant velocity joint.

Means for Solving the Problems

According to the present invention, before a holder is mounted in a roller, all rolling elements are inserted altogether as an annular array into the roller and placed onto an inner circumferential wall surface in an axial direction of the inner circumferential wall surface from the axial end thereof remote from a one-sided flange.

Therefore, all of the rolling elements loaded on the inner circumferential wall surface of the roller are kept in a keystone state to produce the keystone effect, which locks the rolling elements in place against the inner circumferential wall surface.

Roller assemblies, each comprising a plurality of rolling elements retained on the inner circumferential wall surface of the roller, are mounted respectively on trunnions of a spider and then inserted into an outer cup such that the rollers engage in respective guide grooves thereby constructing a constant velocity joint.

Further, according to the present invention, before a holder is mounted in a roller, all rolling elements excluding one are arranged as an annular array on an inner circumferential wall surface of a roller, and then the excluded rolling element is inserted into a gap between two of the rolling elements arranged as the annular array in an axial direction of the inner circumferential wall surface from the axial end thereof remote from a one-sided flange.

Therefore, all of the rolling elements loaded on the inner circumferential wall surface of the roller are also kept in a keystone state to produce the keystone effect, which locks the rolling elements in place against the inner circumferential wall surface.

According to the present invention, after loading all rolling elements along the inner circumferential wall surface of the roller, a lubricant is supplied to the inner circumferential wall surface to secure a holder introduced along the inner circumferential wall surface by a viscosity of the lubricant.

DESCRIPTION OF THE PREFERRED EMBODIMENTS

Figure 1:
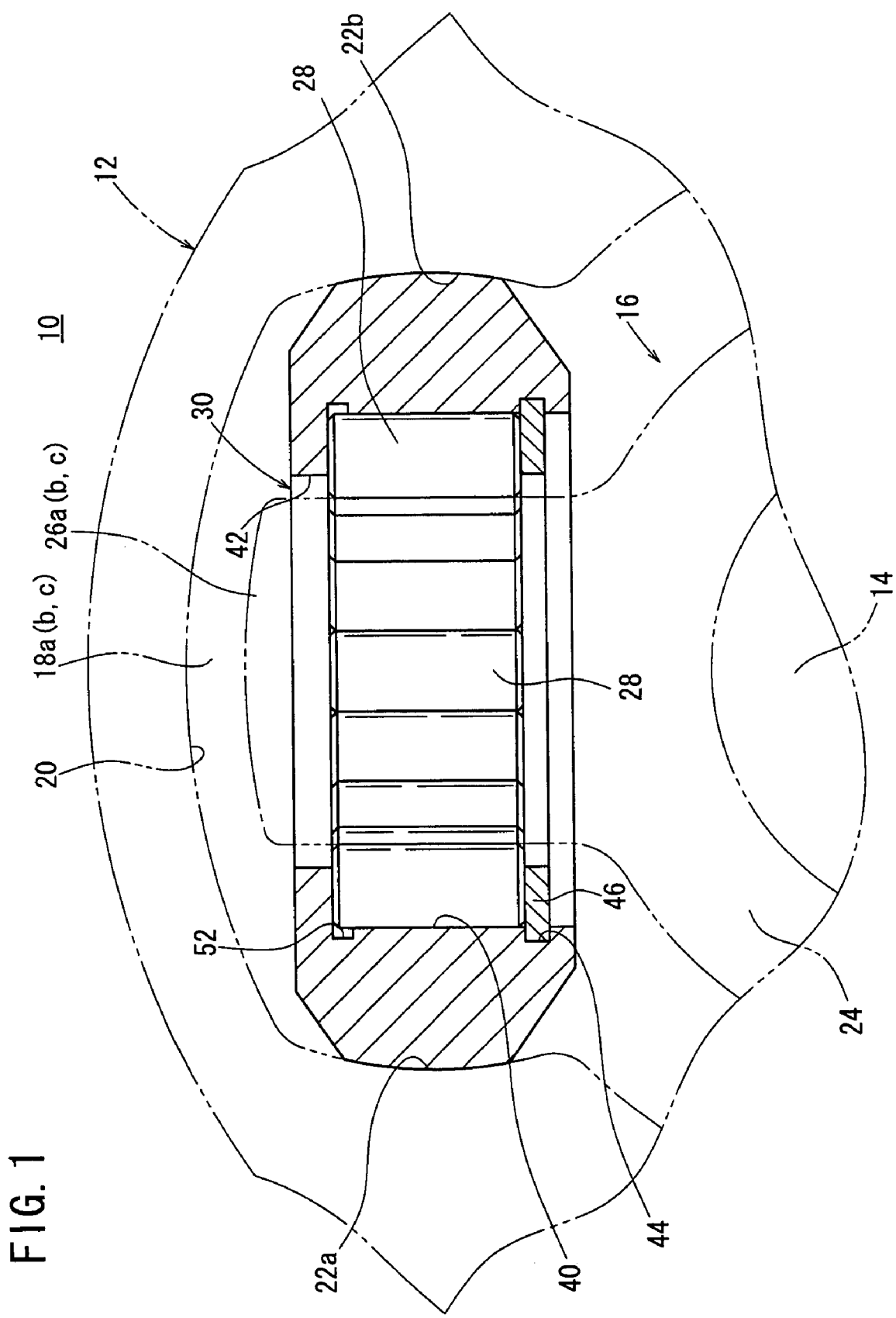
FIG. 1 is an enlarged fragmentary vertical cross-sectional view of a tripod constant velocity joint, taken along a plane perpendicular to the axis of the tripod constant velocity joint, according to an embodiment of the present invention.

FIG. 1 shows a tripod constant velocity joint 10 according to an embodiment of the present invention. The tripod constant velocity joint 10 basically comprises a tubular outer cup (outer member) 12 integrally coupled to an end of a first shaft (not shown) and having an opening, and an inner member 16 fixed to an end of a second shaft 14 and housed in the opening of the outer cup 12.

As shown in FIG. 1, the outer cup 12 has three guide grooves 18a through 18c defined in an inner wall surface thereof. The guide grooves 18b, 18c are omitted from illustration in FIG. 1. The guide grooves 18a through 18c extend in the axial direction of the outer cup 12 and are angularly spaced at angular intervals of 120° around the axis of the outer cup 12. Each of the guide grooves 18a through 18c comprises a ceiling 20 having an arcuate cross section and two sliding surfaces 22a, 22b disposed on respective opposite sides of the ceiling 20 in confronting relation to each other and each having an arcuate cross section.

The inner member 16 comprises a ring-shaped spider 24 fitted over the second shaft 14. The spider 24 has three integral trunnions 26a through 26c projecting radially from an outer circumferential surface thereof into the respective guide grooves 18a through 18c and angularly spaced at angular intervals of 120° around the axis of the spider 24. The trunnions 26b, 26c are omitted from illustration in FIG. 1.

A ring-shaped roller 30 is fitted over each of the trunnions 26a through 26c with a plurality of rolling elements 28 interposed therebetween. The rolling elements 28 may comprise roll bearing elements such as needles, rolls, or the like.

Figure 2:
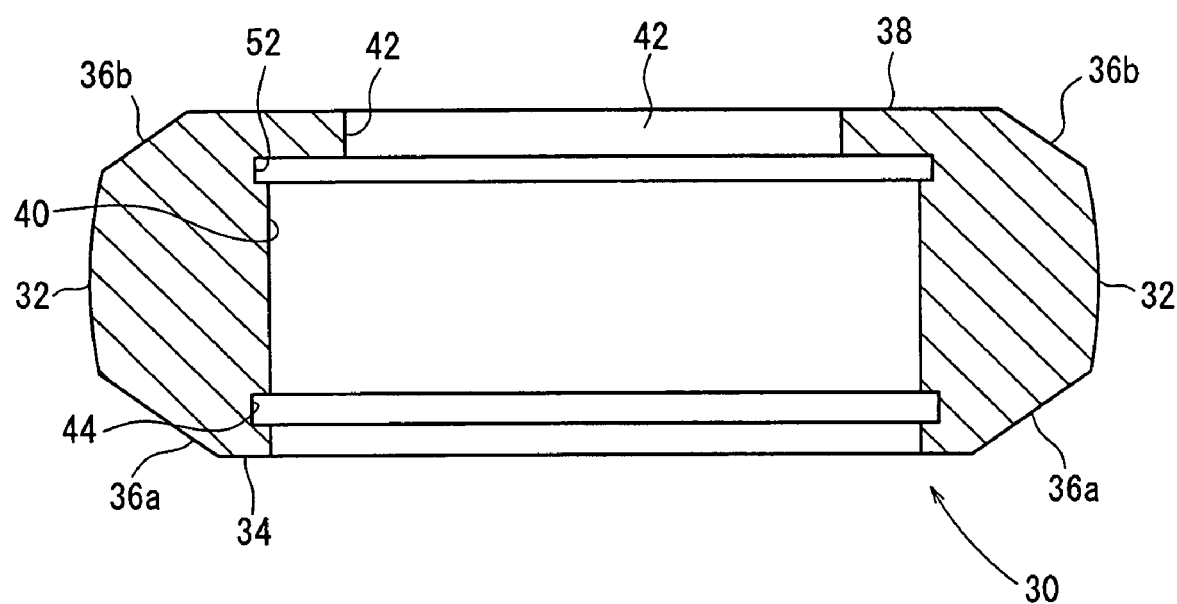
FIG. 2 is a vertical cross-sectional view of a roller of the tripod constant velocity joint shown in FIG. 1.

As shown in FIG. 2, the roller 30 has an outer circumferential surface comprising an arcuate surface 32 complementary in cross-sectional shape to the sliding surfaces 22a, 22b for face-to-face contact with the sliding surfaces 22a, 22b, a first annular slanted surface 36a extending from the arcuate surface 32 into a first end face 34 of the roller 30, and a second annular slanted surface 36b extending from the arcuate surface 32 into a second end face 38 of the roller 30 which is axially opposite to the first end face 34.

The roller 30 has an inner circumferential wall surface 40 having a constant diameter and functioning as a rolling surface with which the rolling elements 28 is held in rolling engagement. The roller 30 also has an annular flange (one-sided flange) 42 integrally projecting radially a predetermined length from an upper portion (an end) of the inner circumferential wall surface 40. A circlip (holder) 46 is mounted in an annular groove 44 defined in a lower portion (an opposite end) of the inner circumferential wall surface 40 remotely from the flange 42. The rolling elements 28 are mounted on the inner circumferential wall surface 40 of the roller 30 and vertically held in position between the circlip 46 and the flange 42.

Figure 3:
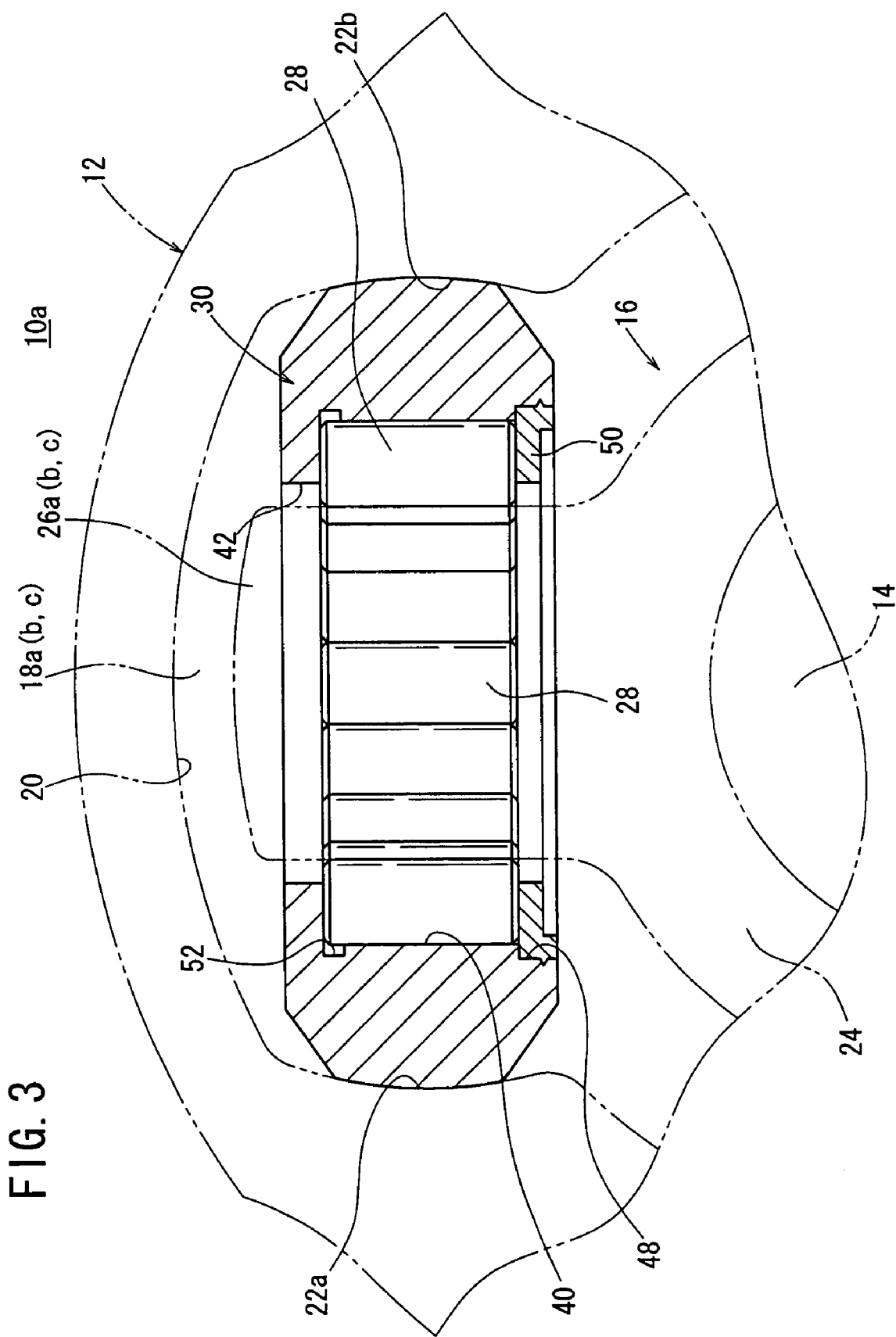
FIG. 3 is an enlarged fragmentary vertical cross-sectional view of a first modification of the tripod constant velocity joint shown in FIG. 1.

As shown in FIG. 3, the circlip 46 may be replaced with a washer (holder) 50 press-fitted in an annular recess 48 defined in the roller 30.

The holder is not limited to the circlip 46 or the washer 50, but may comprise a clip, a press-fitted member, a spring lock washer, a spring washer, a snap ring, a retaining ring, a grip snap ring, a ring, or the like.

Figure 4:
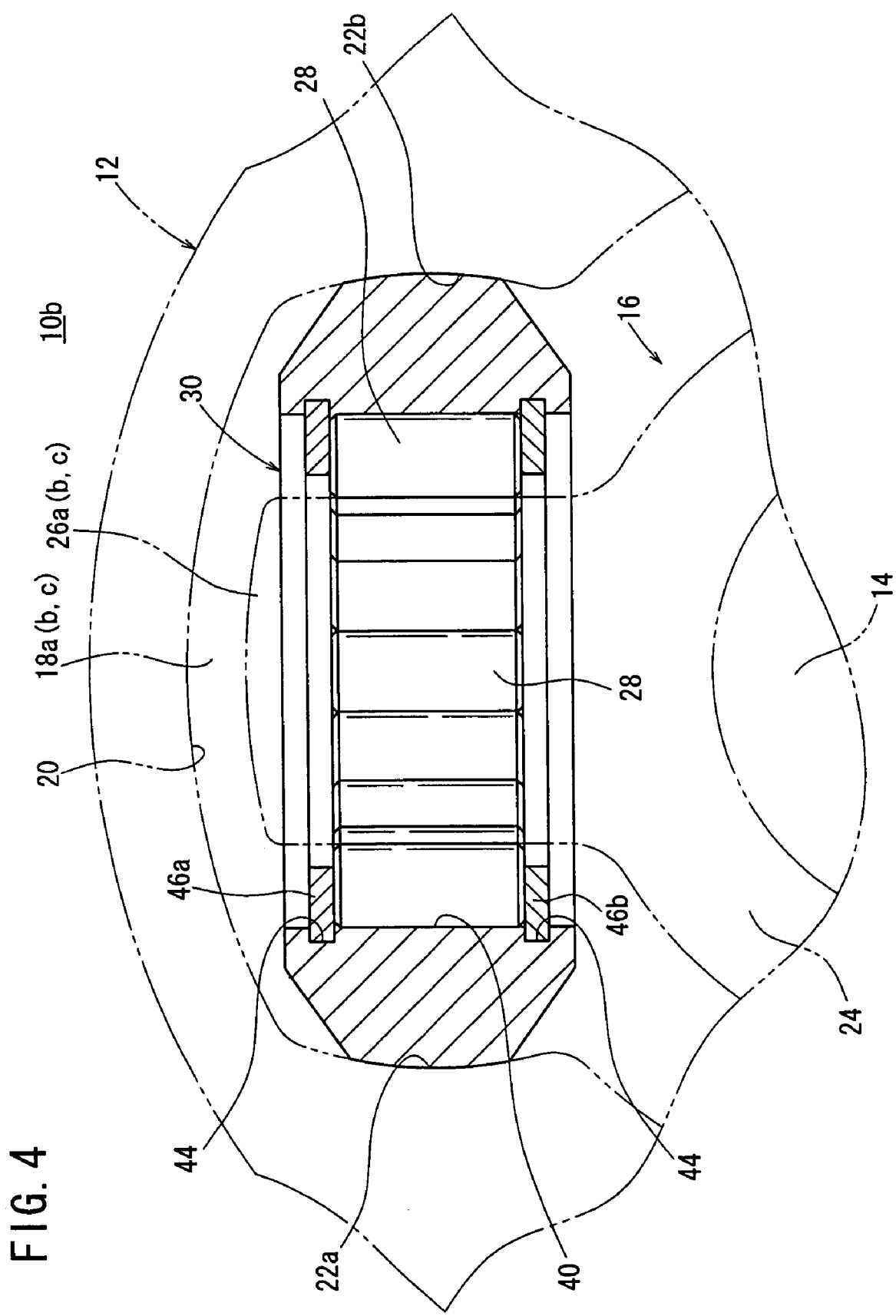
FIG. 4 is an enlarged fragmentary vertical cross-sectional view of a second modification of the tripod constant velocity joint shown in FIG. 1.

As shown in FIG. 4, circlips 46a, 46b may be mounted in respective axially opposite ends of the inner circumferential wall surface 40 of the roller 30, holding the rolling elements 28 between the circlips 46a, 46b. One of the circlips 46a functions as a one-sided flange, and the other as a holder.

With the tripod constant velocity joint, since the trunnion 26a (26b, 26c) and the roller 30 tend to slide relatively to each other in the axial direction of the trunnion 26a (26b, 26c), holders such as circlips, washers, or the like need to be mounted on the opposite ends of the inner circumferential wall surface 40 of the roller 30 for preventing the rolling elements 28 from being displaced axially of the trunnion 26a (26b, 26c).

The relative sliding movement of the trunnion 26a (26b, 26c) and the roller 30 includes sliding movement of the trunnion 26a (26b, 26c) in the axial direction thereof with respect to the roller 30 and sliding movement of the roller 30 in the axial direction thereof with respect to the trunnion 26a (26b, 26c).

As shown in FIG. 2, an annular groove 52 is defined at a boundary between the inner circumferential wall surface 40 of the roller 30 and the flange 42. The annular groove 52 functions as a lubricant reservoir for holding a lubricant such as a grease, a wax, or the like to be described below, when the inner circumferential wall surface 40 is coated with the lubricant.

The rolling elements 28 are disposed on the inner circumferential wall surface 40 substantially parallel to each other in the circumferential direction of the roller 30. The rolling elements 28 are retained in place against the inner circumferential wall surface 40 by the flange 42 projecting radially from the end of the inner circumferential wall surface 40. The rolling elements 28 have substantially the same diameter and substantially the same shape. The trunnion 26a (26b, 26c) is in the form of a cylindrical body having a constant outside diameter.

The constant velocity joint 10 according to the present embodiment is basically constructed as described above. Operation and advantages of the constant velocity joint 10 will be described below.

A first process of assembling the constant velocity joint 10, i.e., a process of installing the rolling elements 28 in the roller 30, will be described below.

Figure 5:
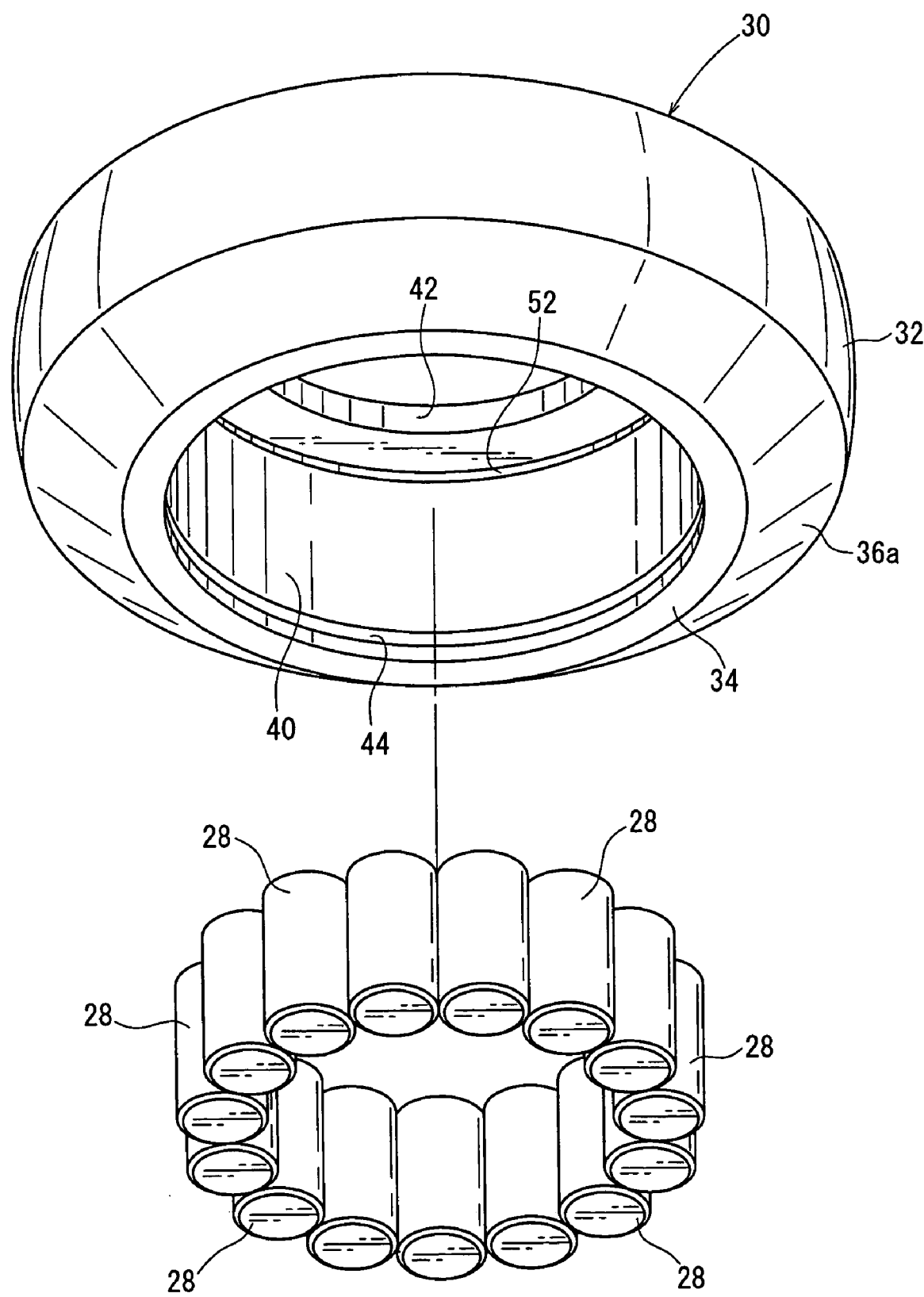
FIG. 5 is a perspective view showing the manner in which all rolling elements are inserted altogether into the roller from below.
Figure 6:
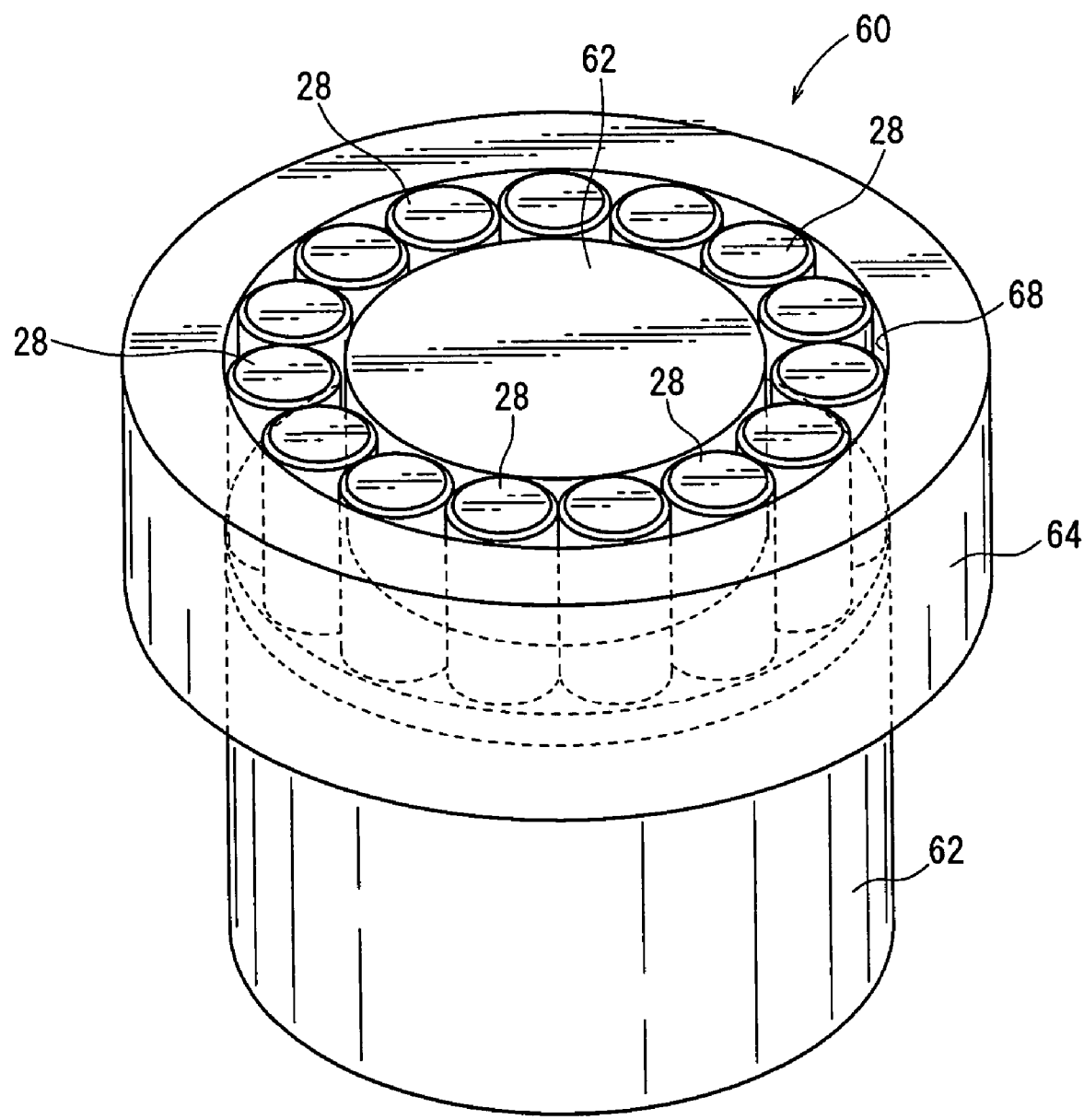
FIG. 6 is a perspective view showing the manner in which all rolling elements are loaded in an annular step of a jig.

As shown in FIG. 5, all (a predetermined number) rolling elements 28 are inserted altogether into the roller 30, i.e., placed onto the inner circumferential wall surface 40, in an axial direction of the inner circumferential wall surface 40, i.e., a direction opposite to the flange 42, using a jig 60 (see FIG. 6). The inner circumferential wall surface 40 is coated with a lubricant such as a grease or the like in advance.

All of the rolling elements 28 inserted altogether into the roller 30 may be held in place by the lubricant. Alternatively, all of the rolling elements 28 inserted altogether into the roller 30 may be held in place by a mechanical or physical holding means. For example, all of the rolling elements 28 inserted altogether into the roller 30 may be held in place by magnetic forces of a magnet.

Figure 7:
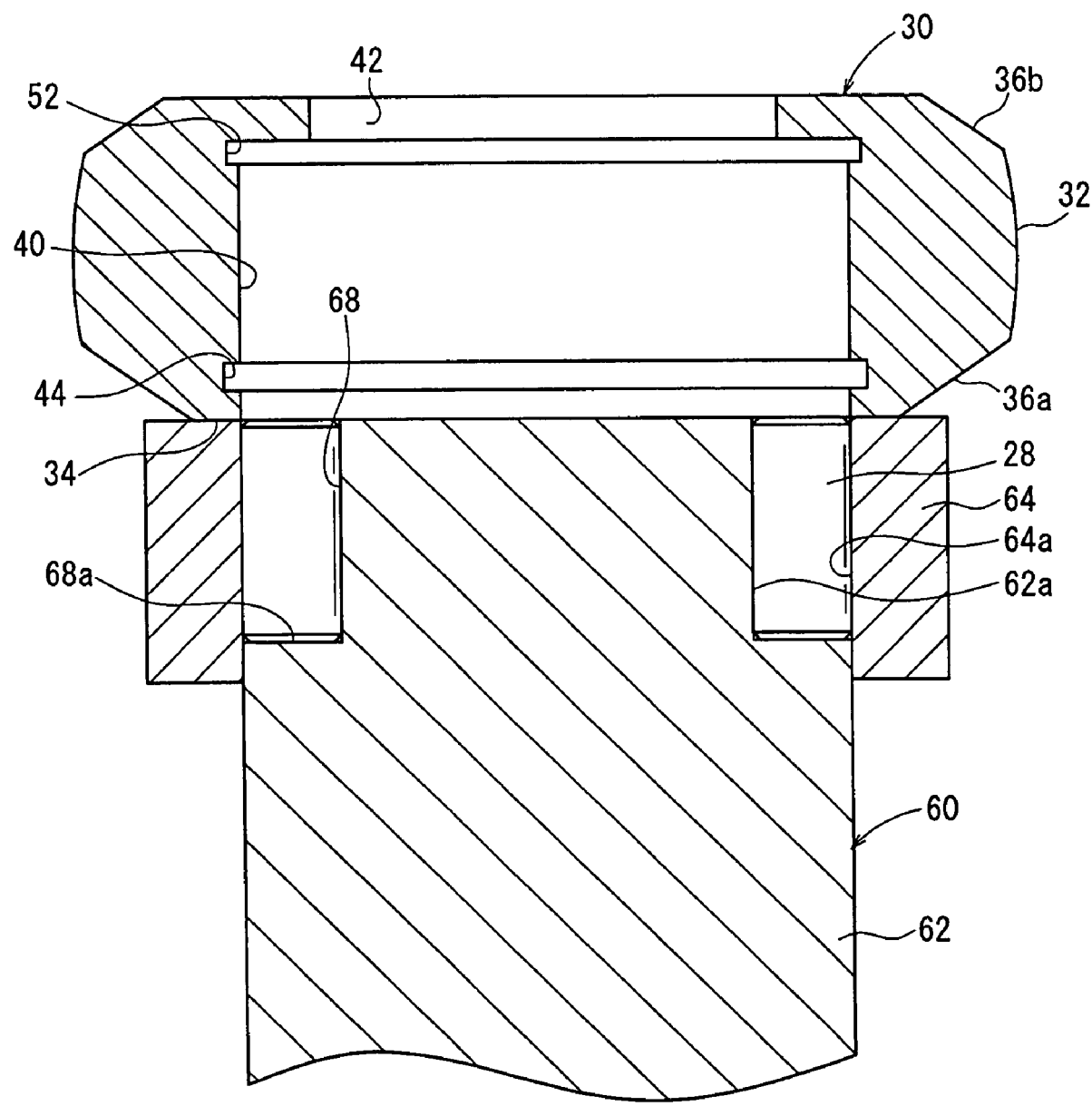
FIG. 7 is a vertical cross-sectional view showing the manner in which the jig is held in abutment against the roller before the rolling elements are inserted into the roller.

As shown in FIGS. 6 and 7, the jig 60 comprises a cylindrical body 62 and a ring 64 surrounding the outer circumferential surface of an axial end of the cylindrical body 62. The cylindrical body 62 has an annular step 68 defined therein radially inwardly of the ring 64. The annular step 68 provides a space for accommodating all of the rolling elements 28 as a circumferential array therein. All of the rolling elements 28 are placed in the annular step 68, and the jig 60 is held in abutment against the roller 30. When the cylindrical body 62 is lifted toward the roller 30, all of the rolling elements 28 are pushed altogether into the roller 30.

The rolling elements 28 loaded in the annular step 68 are constrained in the space between an outer circumferential surface 62a of the cylindrical body 62 and an inner circumferential surface 64a of the ring 64, and are supported by a wall surface 68a of the annular step 68 (see FIG. 7).

As shown in FIG. 6, the rolling elements 28 are annularly arrayed and loaded in and along the annular step 68 of the jig 60. When all of the rolling elements 28 (which may, but not necessarily, be 15 rolling elements 28 as shown in FIG. 6) are loaded in the annular step 68, all of the rolling elements 28 may not be kept in a keystone state capable of producing the keystone effect, but should preferably be kept in a keystone state capable of producing the keystone effect, and more preferably be kept in a state wherein the keystone effect is produced.

The "keystone state" is a state wherein the rolling elements 28 are prevented from being dislodged from the inner circumferential wall surface 40 of the roller 30 due to the keystone effect, i.e., a state wherein the rolling elements 28 are placed on the inner circumferential wall surface 40 so as to be able to produce the keystone effect.

Figure 11:
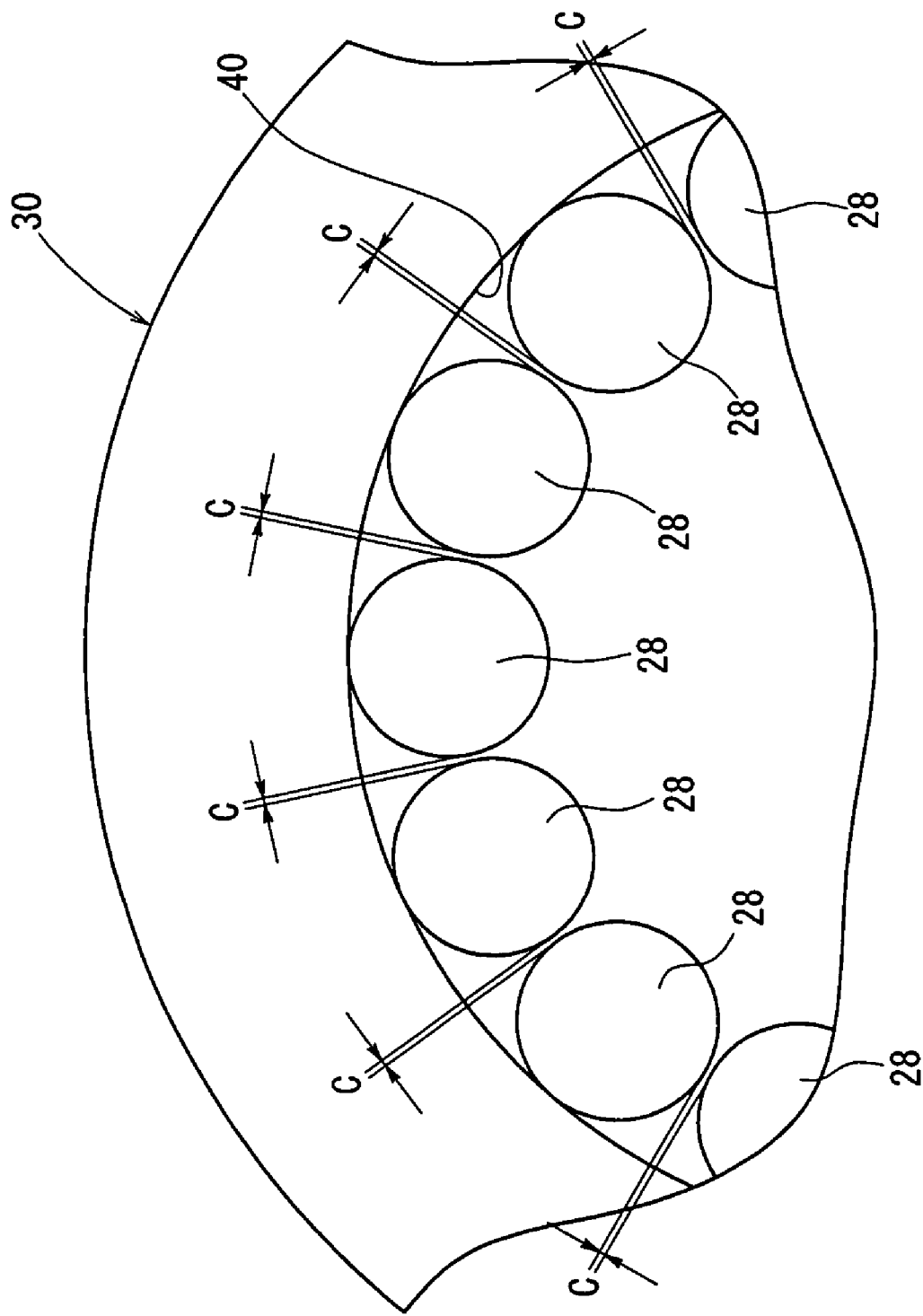
FIG. 11 is an enlarged fragmentary plan view of the rolling elements which are held in the roller due to the keystone effect while being kept out of contact with adjacent rolling elements.

Stated otherwise, the outside diameters of the rolling elements 28 and the inside diameter of the inner circumferential wall surface 40 are preset to predetermined values such that the keystone effect is produced after all of the rolling elements 28 are inserted altogether into the roller 30. All of the rolling elements 28 are in a keystone state even if each of the rolling elements 28 is not in contact with adjacent rolling elements 28 after all of the rolling elements 28 are inserted into the roller 30. FIG. 11 shows the keystone state wherein all of the rolling elements 28 are held out of contact with adjacent rolling elements 28 with clearances C interposed therebetween and are held in contact with the inner circumferential wall surface 40. The rolling elements 28 may not necessarily be held in contact with the inner circumferential wall surface 40.

Then, as shown in FIG. 7, the upper surface of the ring 64 is brought into abutment against the first end face 34 of the roller 30 remote from the flange 42, and while the ring 64 is fixed in place, the cylindrical body 62 is axially lifted to push and insert all of the rolling elements 28 into the roller 30 to place them altogether onto the inner circumferential wall surface 40.

Figure 8:
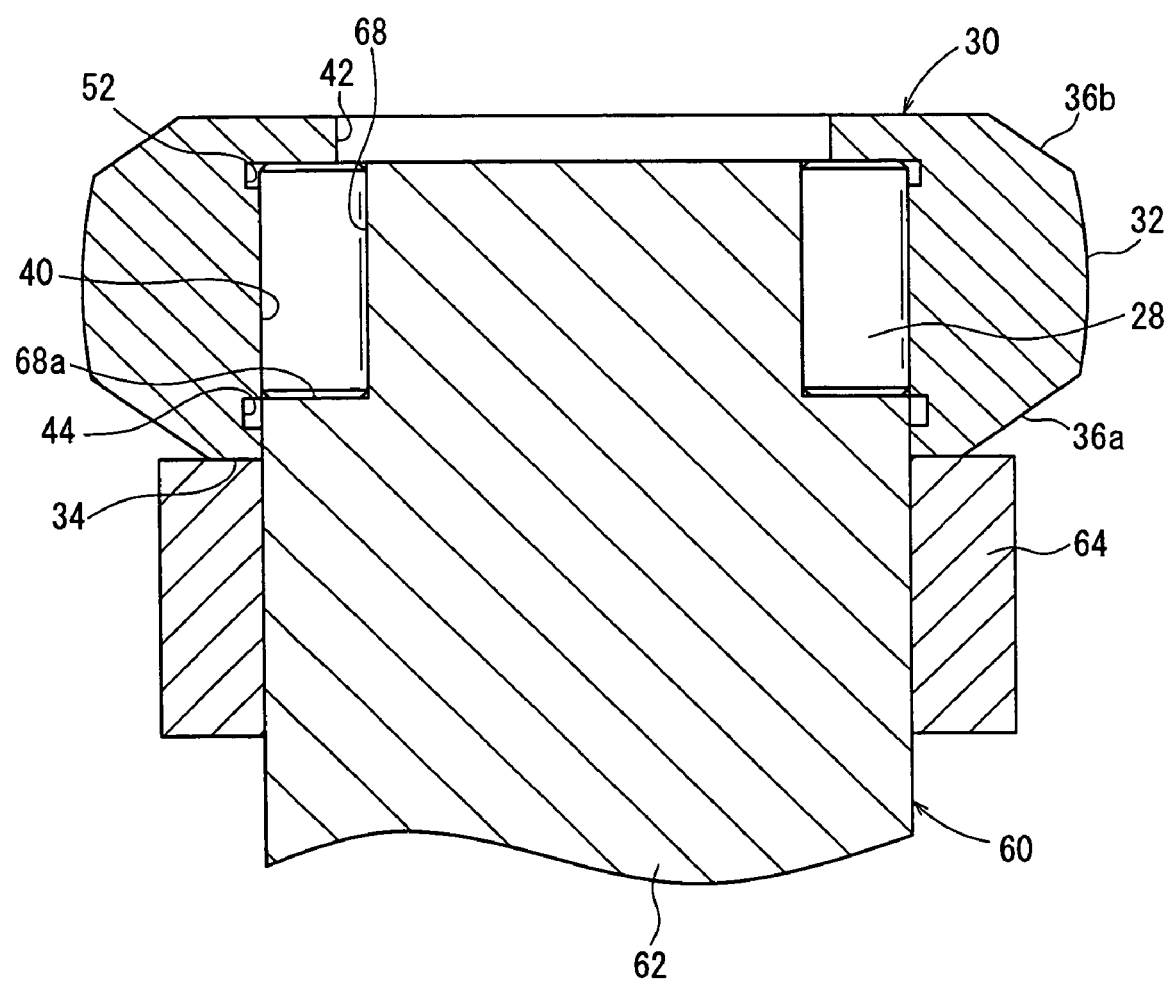
FIG. 8 is a vertical cross-sectional view showing the manner in which a cylindrical body of the jig is lifted to insert all the rolling elements into the roller.

When the cylindrical body 62 is lifted, as shown in FIG. 8, all of the rolling elements 28 are displaced altogether in the axial direction of the inner circumferential wall surface 40, and inserted into the roller 30.

At this time, all of the rolling elements 28 are not pressed under pressing forces, but merely displaced and inserted into the roller 30 along the inner circumferential wall surface 40. The displacement of the rolling elements 28 inserted into the roller 30 is limited when the leading ends of the rolling elements 28 abut against the flange 42.

The rolling elements 28 remain loaded on the inner circumferential wall surface 40 by the lubricant applied to the inner circumferential wall surface 40. Then, the circlip 46 is placed into the annular groove 44, retaining the rolling elements 28 between the circlip 46 and the flange 42.

Figure 10:
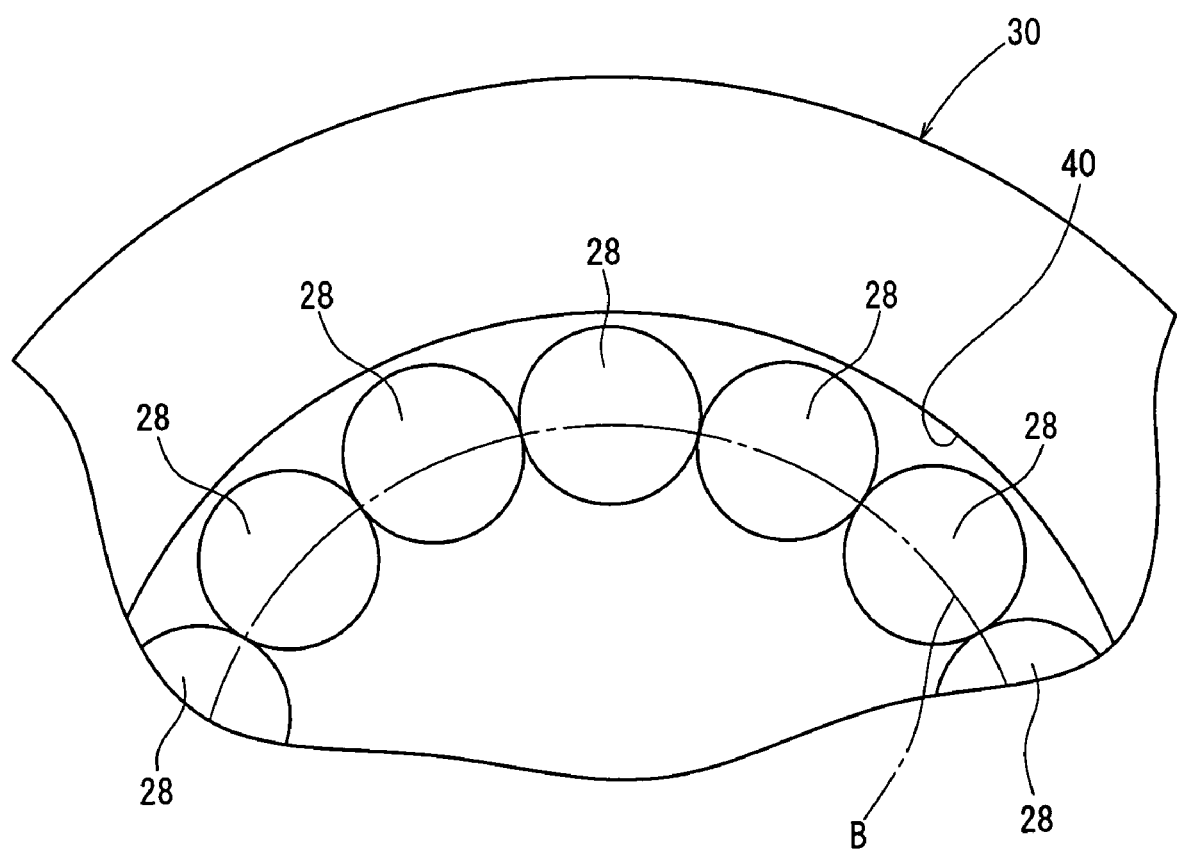
FIG. 10 is an enlarged fragmentary plan view of the rolling elements which are held in the roller due to the keystone effect.

All of the rolling elements 28 loaded on the inner circumferential wall surface 40 are kept in the keystone state to produce the keystone effect, which locks the rolling elements 28 in place against the inner circumferential wall surface 40. FIG. 10 shows all of the rolling elements 28 held in place in the roller 30 by the keystone effect. The dot-and-dash line in FIG. 10 represents a hypothetical circle B interconnecting a plurality of contact points where adjacent rolling elements 28 contact each other due to the keystone effect.

Figure 9:
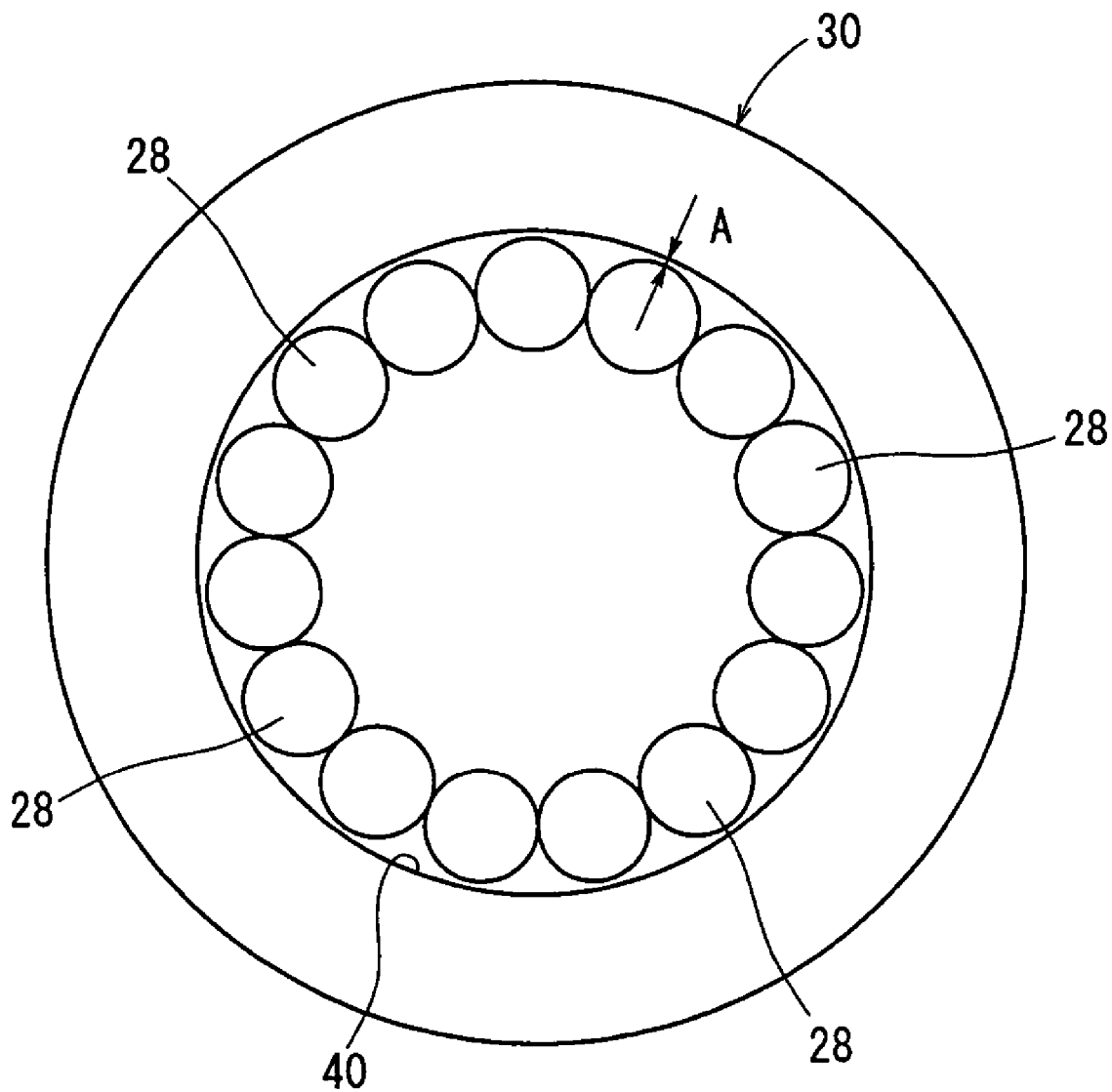
FIG. 9 is a plan view showing a radial clearance between an inner circumferential wall surface of the roller and the rolling elements.

As shown in FIG. 9, the rolling elements 28 can be inserted more easily by the jig 60 if a radial clearance A is provided between the inner circumferential wall surface 40 and the rolling elements 28. The radial clearance A may be set to a value in the range from several μm to several tens of μm.

Roller assemblies, each comprising a plurality of rolling elements 28 retained on the inner circumferential wall surface 40 of a roller 30, are mounted respectively on the trunnions 26a, 26b, 26c, and then inserted into the outer cup 12 such that the rollers 30 engage in the respective guide grooves 18a, 18b, 18c, thereby constructing the constant velocity joint 10.

According to the conventional process of assembling the rolling elements 3, the final rolling element 3a is pressed into the gap radially toward the inner circumferential wall surface 2 of the roller 1, thereby installing the rolling elements 3 in an array on and along the inner circumferential wall surface 2. In order to provide the interference for the final rolling element 3a to be pressed into the gap for producing the keystone effect, it is necessary to make as small as possible the inside diameter tolerance of the cylindrical inner circumferential wall surface 2 of the roller 1 and the outside diameter tolerances of the rolling elements 3.

According to the first assembling process, since all of the rolling elements 28 placed parallel to each other in the jig 60 are inserted altogether axially into the roller 30, the rolling elements 28 can be assembled easily and efficiently in the roller 30 for a reduced manufacturing cost without being affected by the outside diameter tolerances of the rolling elements 28 and the inside diameter tolerance of the roller 30.

Stated otherwise, according to the conventional assembling process, since the final rolling element 3a is pressed into the gap radially toward the inner circumferential wall surface 2 of the roller 1 for producing the keystone effect, the tolerances (the inside diameter tolerance of the cylindrical inner circumferential wall surface 2 and the outside diameter tolerances of the rolling elements 3) have to be made as small as possible. According to the first assembling process, however, since all of the rolling elements 28 are inserted altogether into the roller 30 in the axial direction of the inner circumferential wall surface 40 to achieve the keystone state capable of producing the keystone effect, it is not necessary to press in a final rolling element 28.

According to the first assembling process, the outside diameter tolerances of the rolling elements 28 and the inside diameter tolerance of the cylindrical inner circumferential wall surface 40 of the roller 30 can be managed less strictly than the conventional assembling process. Therefore, the rolling elements 28 and the roller 30 can be machined more easily, and the rolling elements 28 can be assembled, i.e., inserted into the roller 30, more easily.

Figure 12:
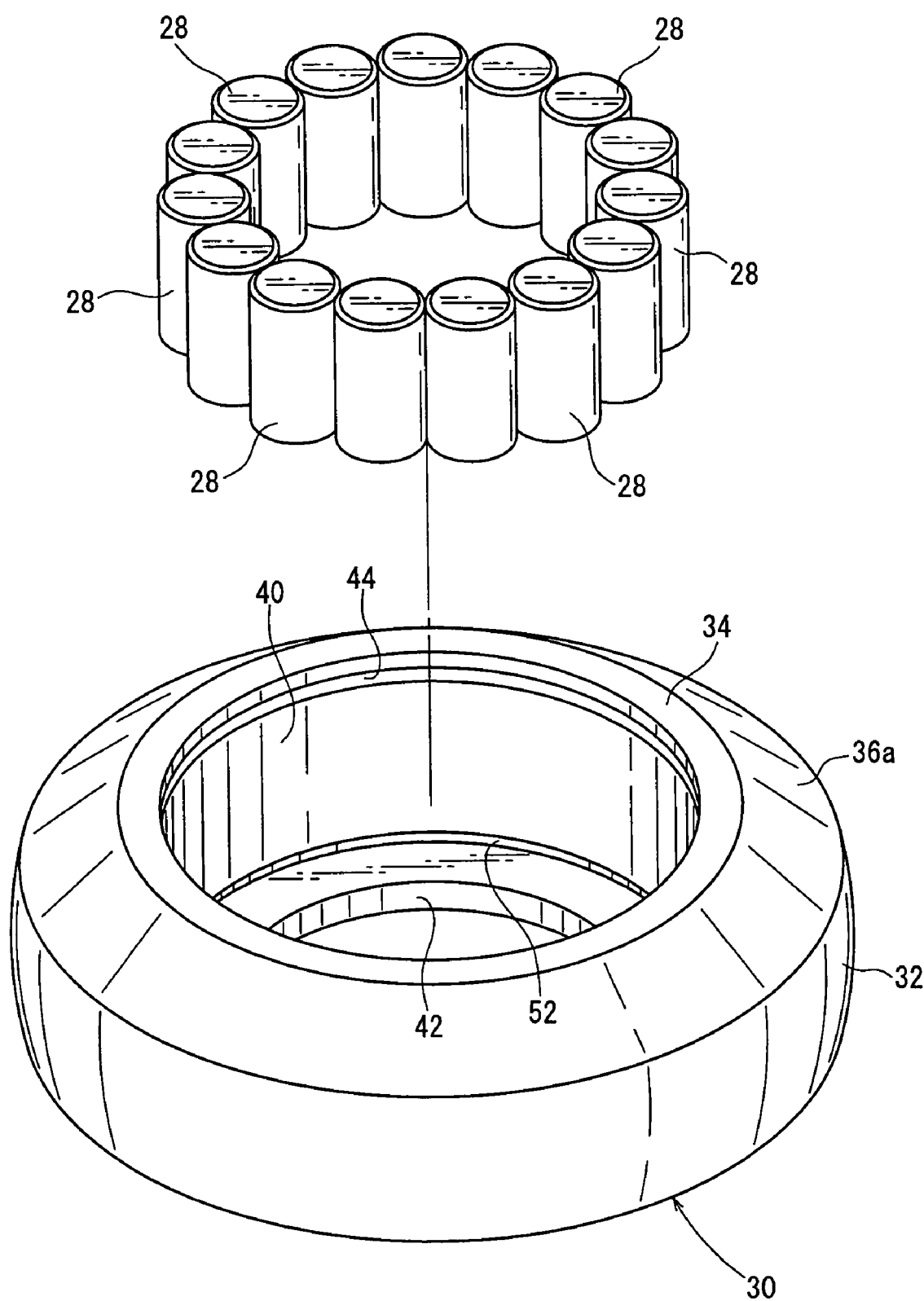
FIG. 12 is a perspective view showing the manner in which all rolling elements are inserted altogether into the roller from above.
Figure 13:
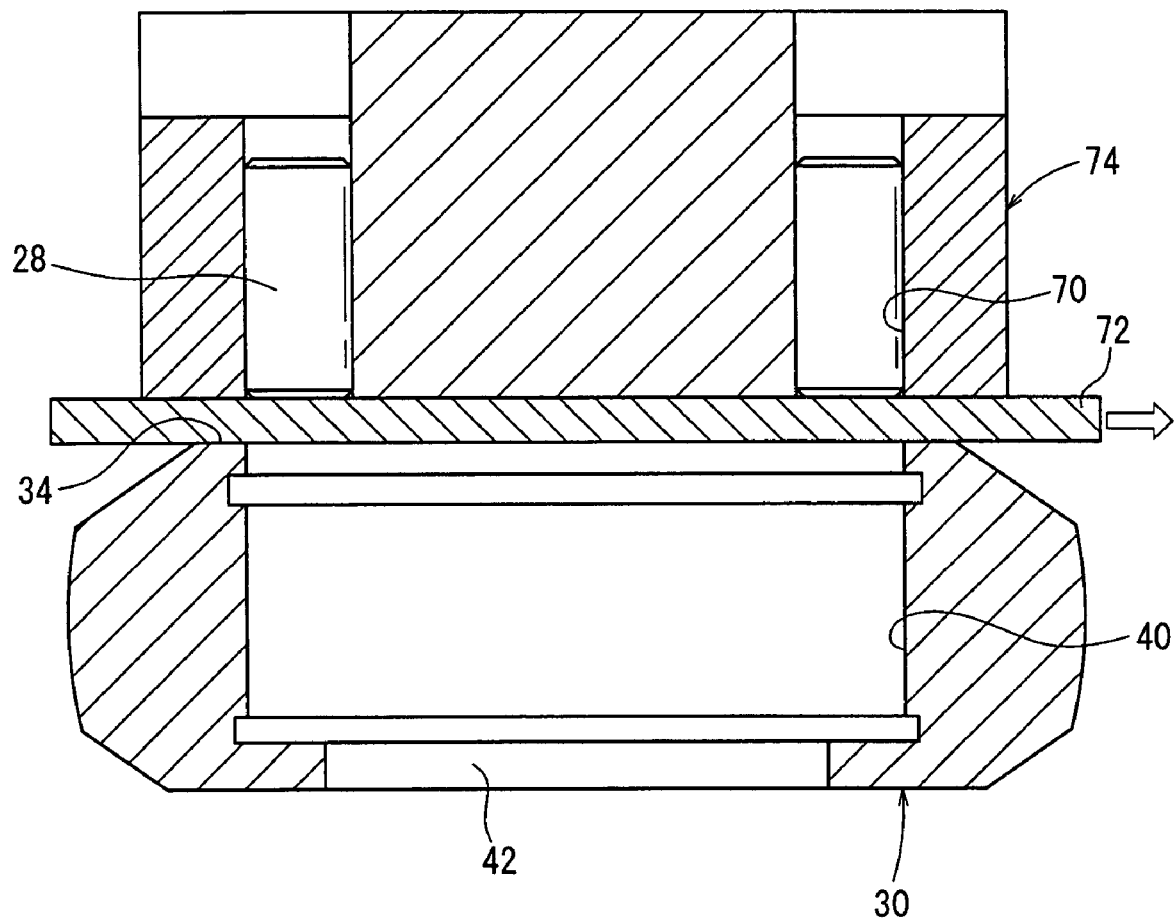
FIG. 13 is a vertical cross-sectional view showing the manner in which another jig having a shutter plate is held in abutment against the roller before the rolling elements are inserted into the roller.

As shown in FIGS. 12 and 13, using another jig 74 having a shutter plate 72 for supporting rolling elements 28 loaded in an annular space 70 from below to prevent the rolling elements 28 from dropping off, all of the rolling elements 28 may be inserted altogether into the roller 30 from above the roller 30, i.e., in a direction opposite to the direction in which the rolling elements 28 are inserted as shown in FIG. 5.

A second process of assembling the constant velocity joint 10, i.e., a process of installing the rolling elements 28 in the roller 30, will be described below. Those parts used in the second assembling process which are identical to those in the first assembling process are denoted by identical reference characters, and will not be described in detail below.

The second assembling process differs from the first assembling process in that after all (a predetermined number) rolling elements 28, excluding one, are loaded into the roller 30 in an axial direction of the inner circumferential wall surface 40, i.e., a direction opposite to the flange 42, using the jig 60, the excluded rolling element 28a (see FIG. 15) is inserted into a gap 69 (see FIG. 14) between two rolling elements 28 in the axial direction of the inner circumferential wall surface 40.

Figure 14:
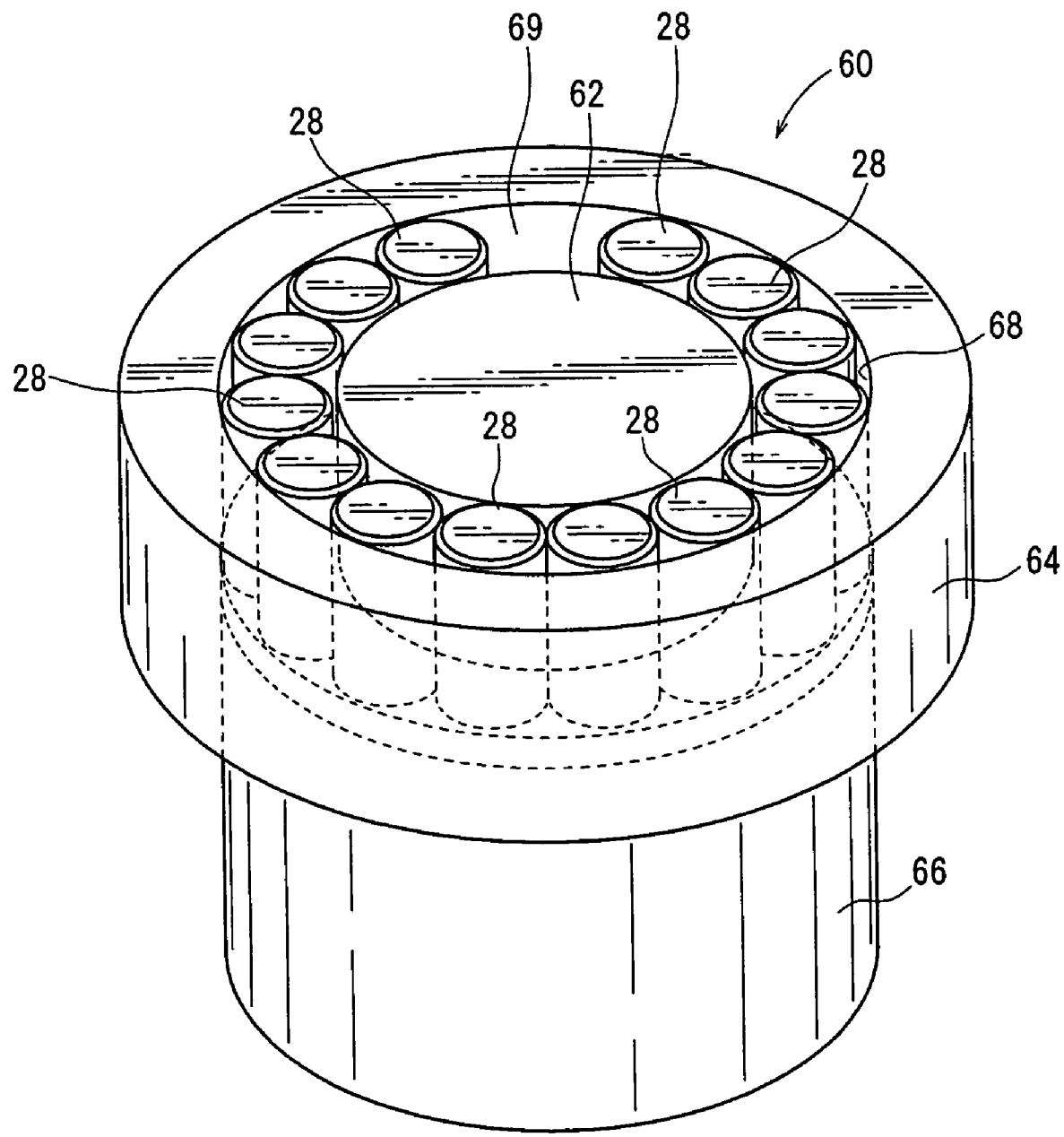
FIG. 14 is a perspective view showing the manner in which a plurality of rolling elements, excluding a final one, are loaded in an annular step of a jig.

As shown in FIG. 14, all of the rolling elements 28, excluding one, are loaded as an annular array in and along the annular step 68 in the jig 60, creating the gap 69 where the excluded rolling element 28a is to be finally inserted. When all of the rolling elements 28 (which may, but not necessarily, be 14 rolling elements 28 as shown in FIG. 14), excluding one, are loaded in the annular step 68, those rolling elements 28 are not kept in the keystone state capable of producing the keystone effect.

Then, as shown in FIG. 7, the upper surface of the ring 64 is brought into abutment against the first end face 34 of the roller 30 remote from the flange 42, and while the ring 64 is fixed in place, the cylindrical body 62 is axially lifted to push and insert all of the rolling elements 28 into the roller 30 to place them altogether onto the inner circumferential wall surface 40.

When the cylindrical body 62 is lifted, as shown in FIG. 8, all of the rolling elements 28, excluding one, are displaced altogether in the axial direction of the inner circumferential wall surface 40, and inserted into the roller 30.

Figure 15:
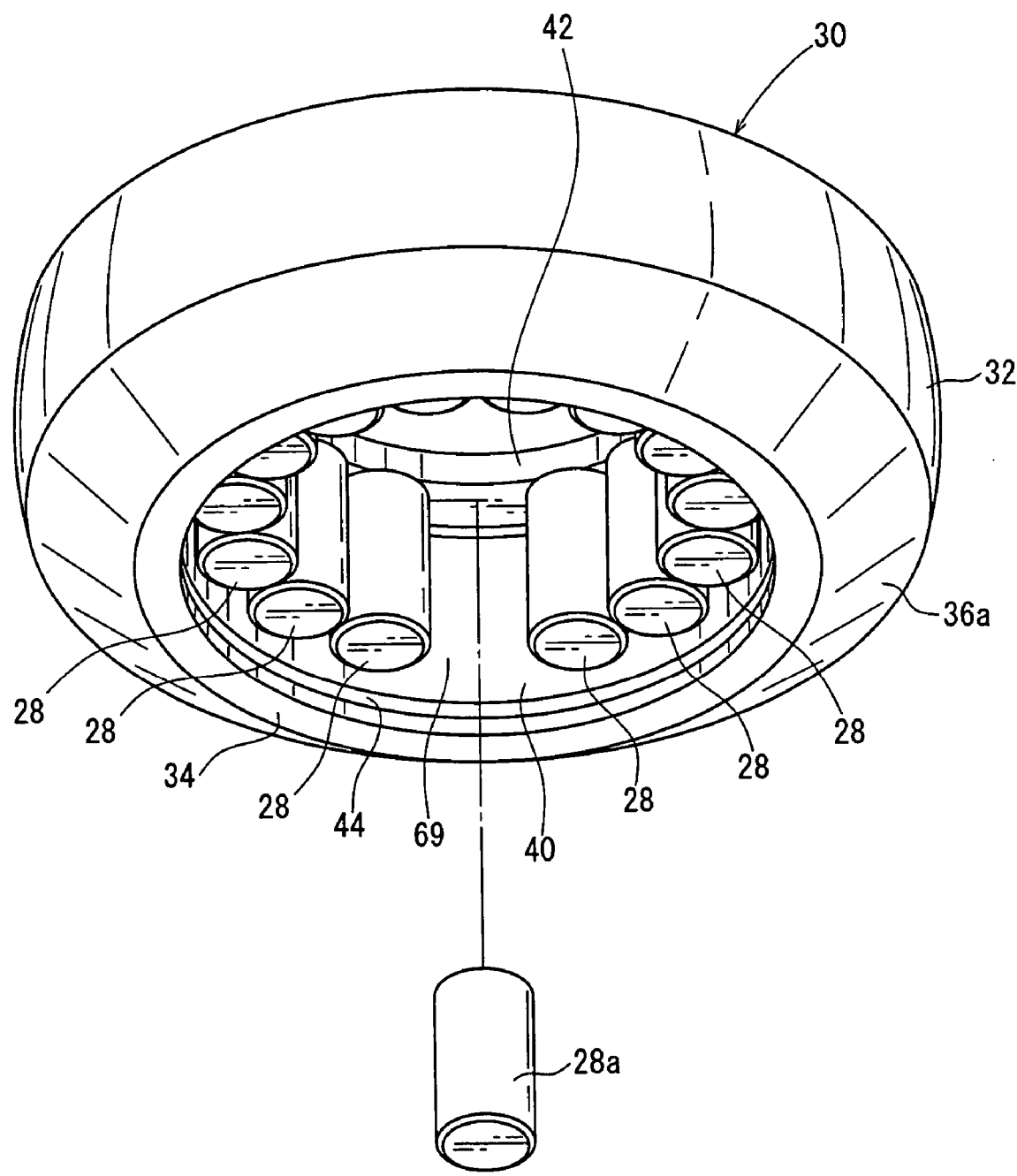
FIG. 15 is a perspective view showing the manner in which a plurality of rolling elements, excluding a final one, are arranged as an annular array on an inner circumferential wall surface of the roller and then the final rolling element is inserted into the gap from below.

Then, as shown in FIG. 15, the excluded rolling element 28a is finally inserted into the gap 69 between two of the rolling elements 28 arrayed on the inner circumferential wall surface 40, in the axial direction (vertical direction) of the inner circumferential wall surface 40.

At this time, the final rolling element 28a is not pressed under pressing forces, but merely displaced and inserted into the gap 69 along the inner circumferential wall surface 40. The displacement of the final rolling element 28a inserted into the gap 69 is limited when the leading end of the final rolling element 28a abuts against the flange 42.

The rolling elements 28 remain loaded on the inner circumferential wall surface 40 by the lubricant applied to the inner circumferential wall surface 40. Then, the circlip 46 is placed into the annular groove 44, retaining the rolling elements 28 between the circlip 46 and the flange 42.

All of the rolling elements 28 loaded on the inner circumferential wall surface 40 are kept in the keystone state to produce the keystone effect, which locks the rolling elements 28 in place.

Figure 16:
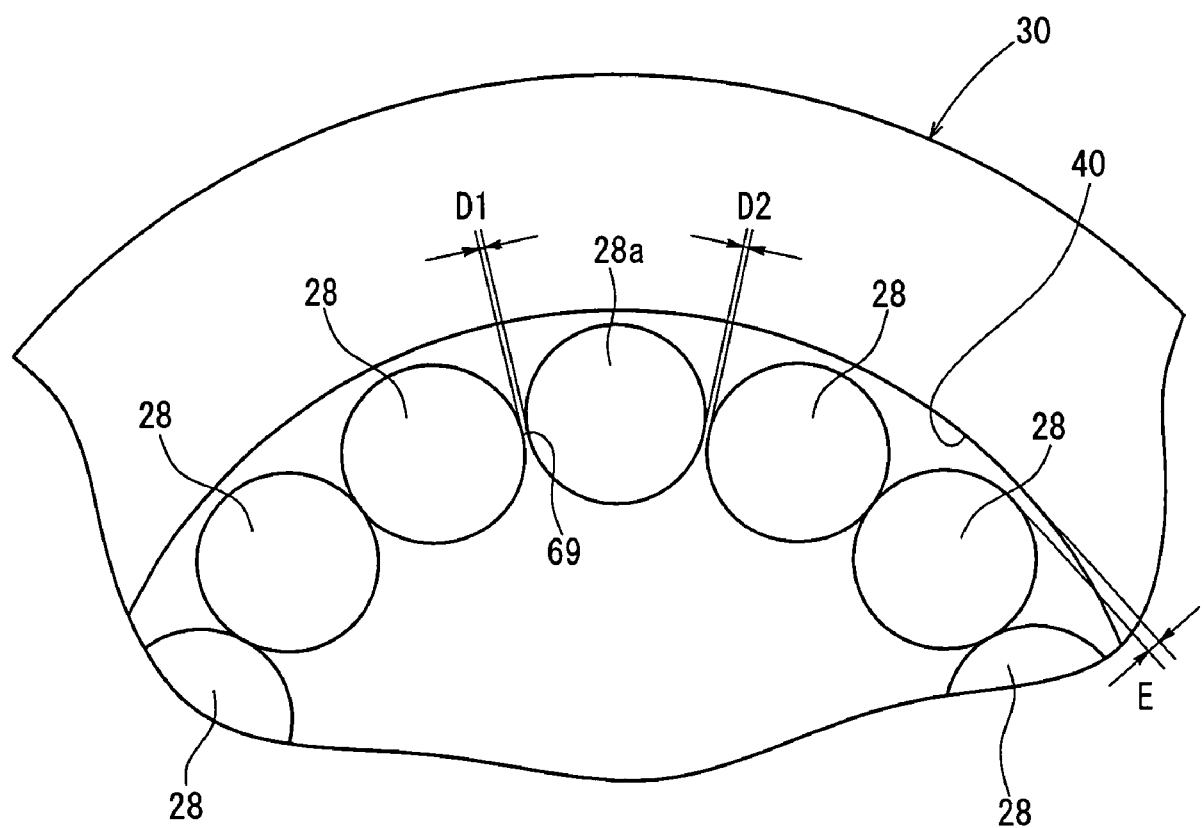
FIG. 16 is an enlarged fragmentary plan view showing an inter-contact-point clearance D1 and an inter-contact-point clearance D2 in the circumferential direction between a rolling element to be inserted finally and adjacent two rolling elements, and a radial clearance E between the inner circumferential wall surface of the roller and the rolling elements.

As shown in FIG. 16, for the insertion of the final rolling element 28a, an inter-contact-point clearance D1 and an inter-contact-point clearance D2 are provided in the circumferential direction between the rolling element 28a and adjacent two rolling elements 28, and a radial clearance E is provided between the inner circumferential wall surface 40 of the roller 30 and the rolling elements 28. These clearances D1, D2, E allow the final rolling element 28a to be inserted more easily. A circumferential clearance C between adjacent rolling elements 28 is set to a value in the range from several μm to several tens of μm, and is equal to the sum of the inter-contact-point clearance D1 and the inter-contact-point clearance D2.

Figure 17:
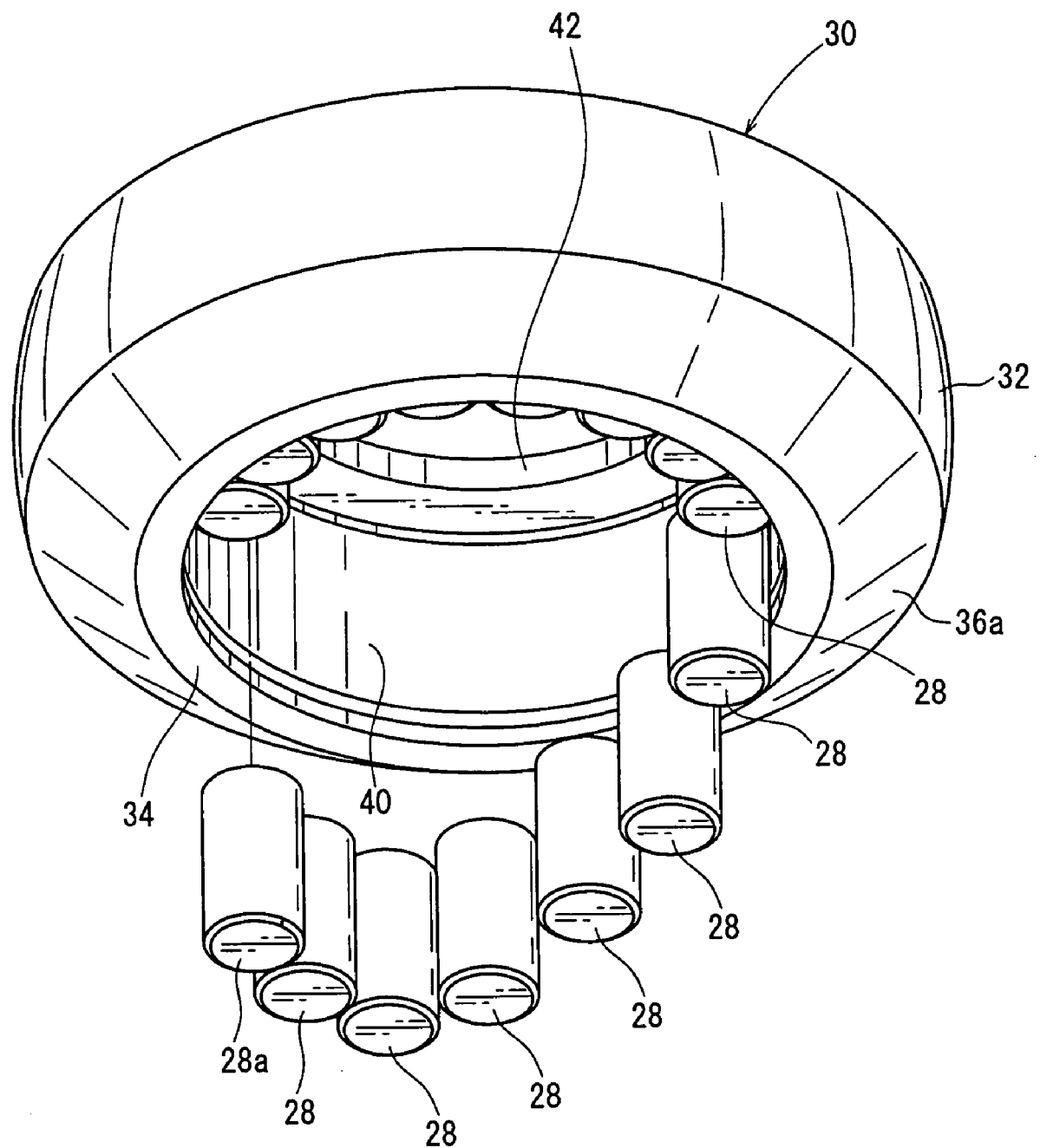
FIG. 17 is a perspective view showing the manner in which a plurality of rolling elements, excluding a final one, are successively inserted into the roller from below.

All of the rolling elements 28, excluding one, may not be loaded altogether, but, as shown in FIG. 17, may be loaded successively in the axial direction (vertical direction) of the inner circumferential wall surface 40 of the roller 30.

According to the second assembling process, all of the rolling elements 28, excluding one, arrayed in the jig 60 are loaded altogether in the axial direction of the inner circumferential wall surface 40, and then the excluded rolling element 28a is finally inserted into the gap 69 between two of the rolling elements 28 arrayed on the inner circumferential wall surface 40, in the axial direction (vertical direction) of the inner circumferential wall surface 40. Therefore, the rolling elements 28 can be assembled easily and efficiently in the roller 30 for a reduced manufacturing cost without being affected by the outside diameter tolerances of the rolling elements 28 and the inside diameter tolerance of the roller 30.

Stated otherwise, according to the conventional assembling process, since the final rolling element 3a is pressed into the gap radially (laterally) toward the inner circumferential wall surface 2 of the roller 1 for producing the keystone effect, the tolerances (the inside diameter tolerance of the cylindrical inner circumferential wall surface 2 and the outside diameter tolerances of the rolling elements 3) have to be made as small as possible. According to the second assembling process, however, since the final rolling element 28a is inserted into the gap 69 in the axial direction of the inner circumferential wall surface 40 to achieve the keystone state capable of producing the keystone effect, it is not necessary to press in the final rolling element 28a.

According to the second assembling process, the outside diameter tolerances of the rolling elements 28 and the inside diameter tolerance of the cylindrical inner circumferential wall surface 40 of the roller 30 can be managed less strictly than the conventional assembling process. Therefore, the rolling elements 28 and the roller 30 can be machined more easily, and the rolling elements 28 can be assembled, i.e., inserted into the roller 30, more easily.

Figure 18:
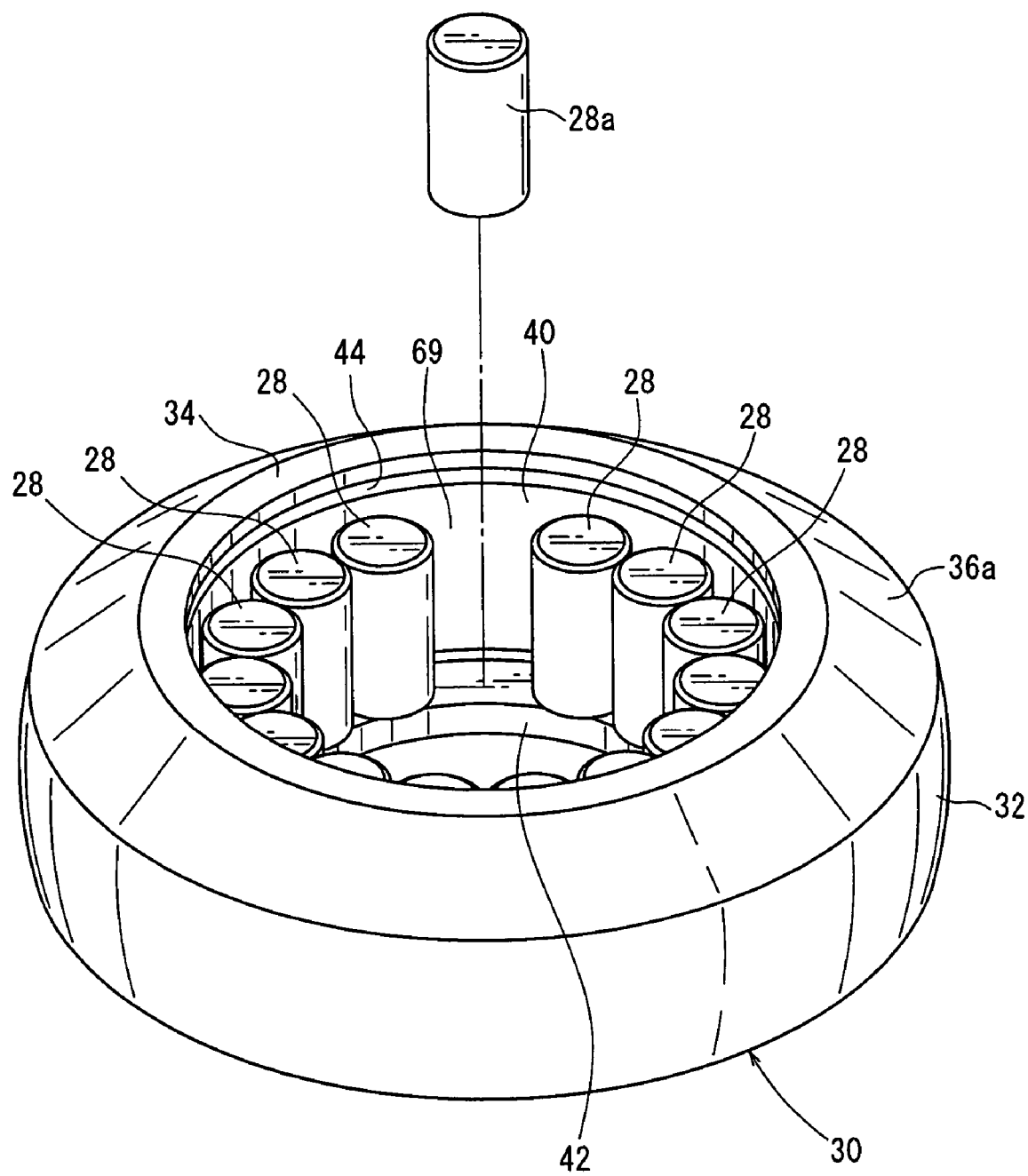
FIG. 18 is a perspective view showing the manner in which a plurality of rolling elements, excluding a final one, are arranged as an annular array on an inner circumferential wall surface of the roller and then the final rolling element is inserted into the gap from above.

Using the jig 74 (see FIG. 13) having the shutter plate 72 for supporting all of the rolling elements 28, excluding one, loaded in the annular space 70 from below to prevent the rolling elements 28 from dropping off, after the shutter plate 72 is horizontally displaced, all of the rolling elements 28 excluding one may be inserted altogether into the roller 30 from above the roller 30, i.e., in a direction opposite to the direction in which the rolling elements 28 are inserted as shown in FIG. 15 (see FIG. 18).

Figure 19:
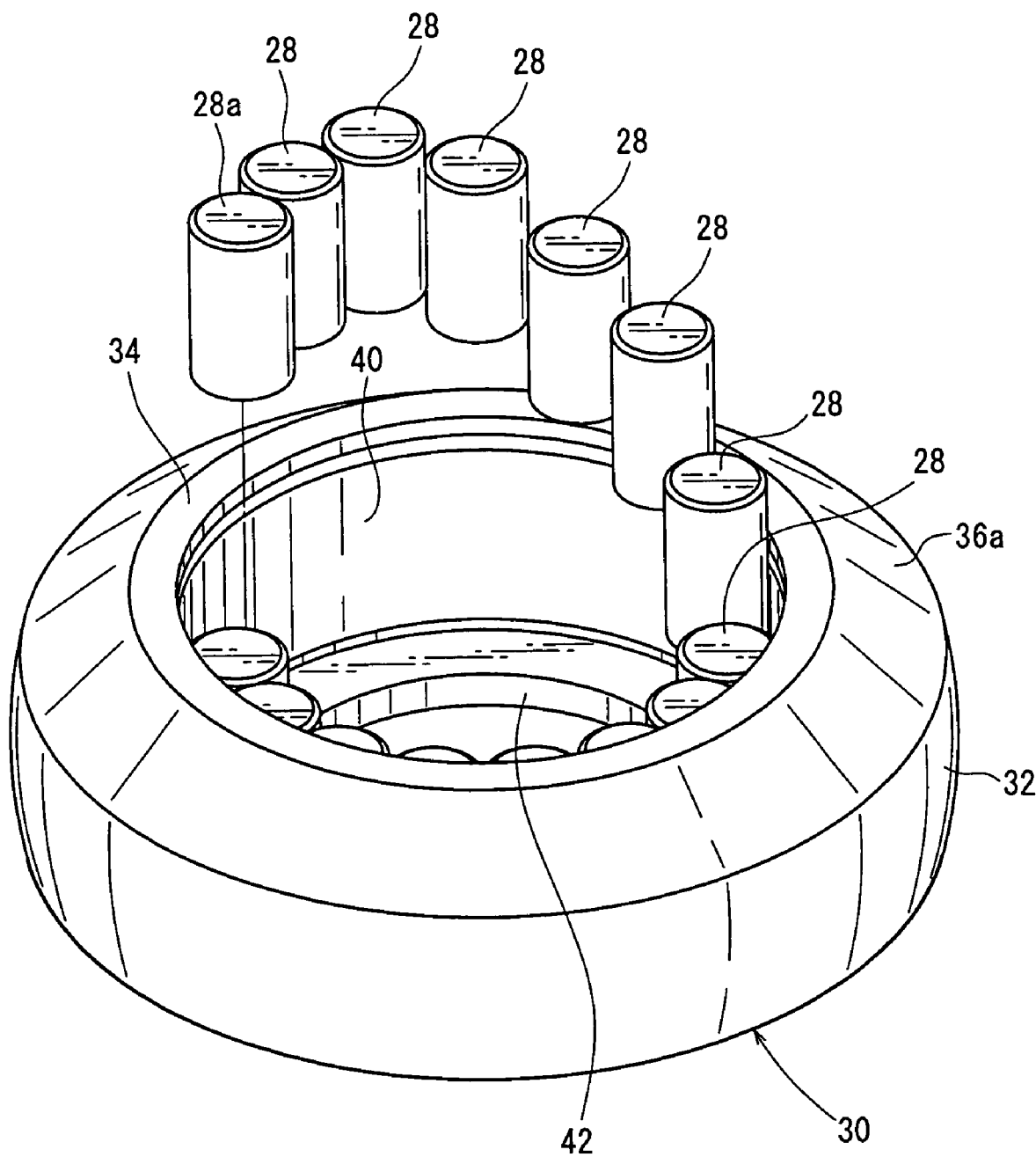
FIG. 19 is a perspective view showing the manner in which a plurality of rolling elements, excluding a final one, are successively inserted into the roller from above.

Alternatively, as shown in FIG. 19, all of the rolling elements 28, excluding one, may successively be loaded into the roller 30. At any rate, the final rolling element 28a is inserted into the gap 69 between two of the rolling elements 28 arrayed on the cylindrical inner circumferential wall surface 40 of the roller 30, as with the above assembling process.

Figure 20:
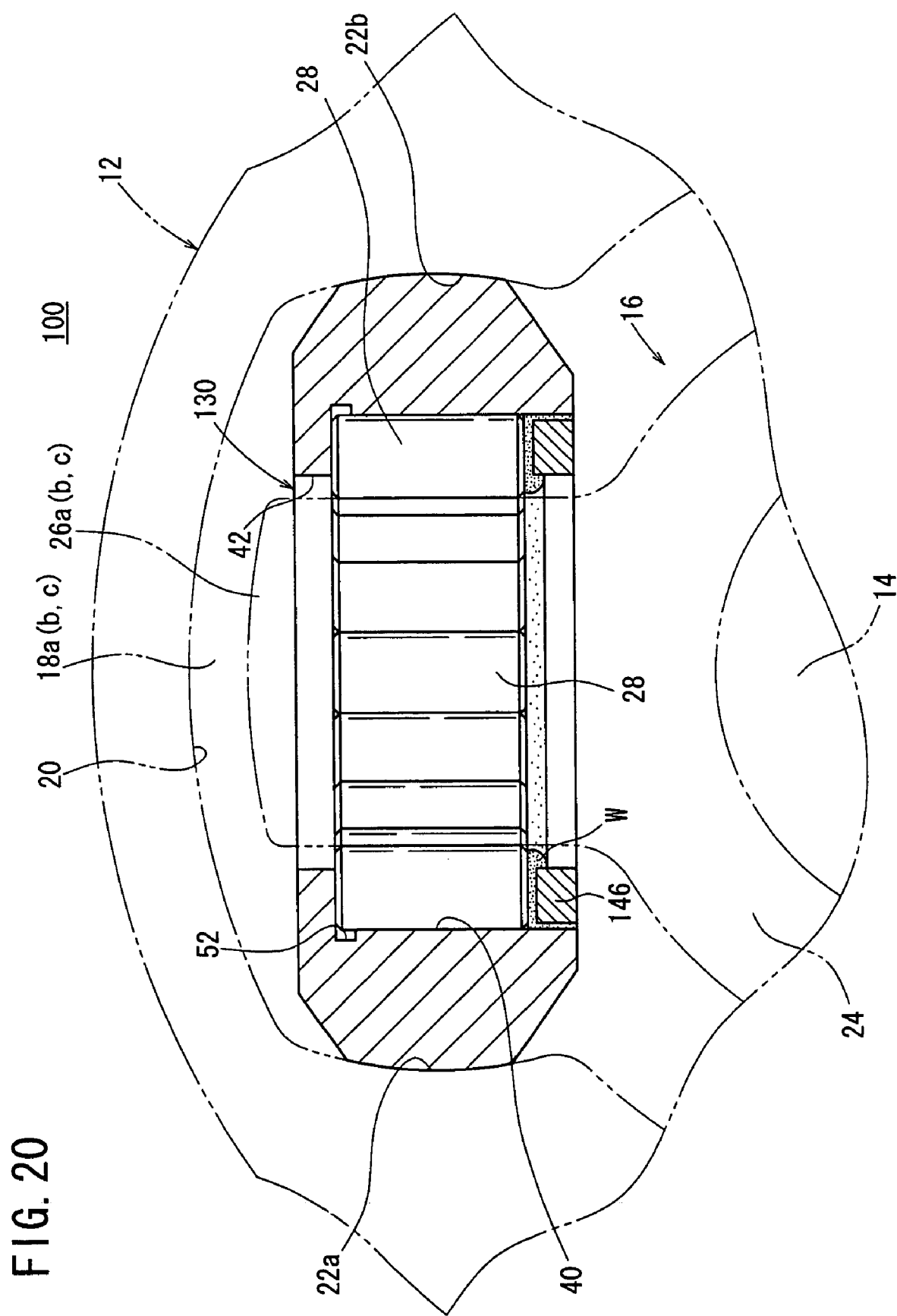
FIG. 20 is an enlarged fragmentary vertical cross-sectional view of a tripod constant velocity joint, taken along a plane perpendicular to the axis of the tripod constant velocity joint, according to another embodiment of the present invention.

FIG. 20 shows a tripod constant velocity joint 100 according to another embodiment of the present invention. Those parts of the tripod constant velocity joint 100 which are identical to the constant velocity joint 10 shown in FIG. 1 are denoted by identical reference characters, and will not be described in detail below.

A ring-shaped roller 130 is fitted over each of the trunnions 26a through 26c with a plurality of rolling elements 28 interposed therebetween. The roller 130 has an inner circumferential wall surface 40 having a constant diameter and functioning as a rolling surface with which the rolling elements 28 is held in rolling engagement. The roller 130 also has an annular flange (one-sided flange) 42 integrally projecting radially a predetermined length from an upper portion (an end) of the inner circumferential wall surface 40. Neither a radially inward projection nor an annular groove is provided on a lower portion (an opposite end) of the inner circumferential wall surface 40 remotely from the flange 42. The lower portion of the inner circumferential wall surface 40 has a cylindrical surface having the same inside diameter as the diameter of the inner circumferential wall surface 40.

Figure 21:
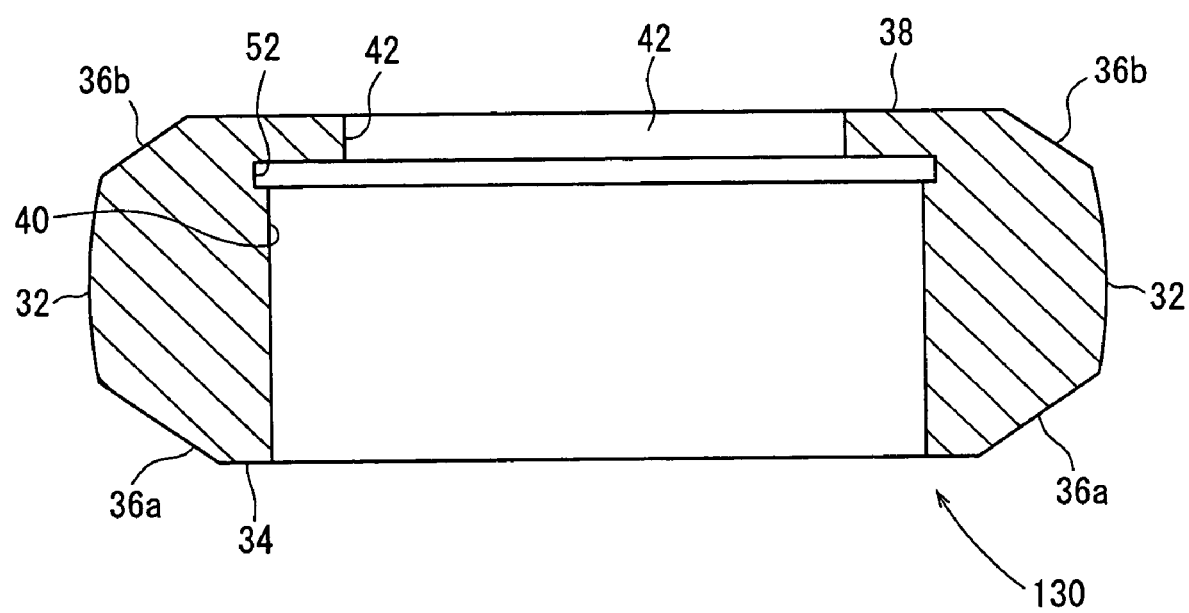
FIG. 21 is a vertical cross-sectional view of a roller of the tripod constant velocity joint shown in FIG. 20.

As shown in FIG. 21, the annular flange 42 is integrally formed with the inner circumferential wall surface 40 of the roller 130. However, the annular flange 42 may be replaced with something functioning as a one-sided flange such as a circlip, a washer, or the like which is mounted in an annular groove defined in the inner circumferential wall surface 40 of the roller 130.

A third process of assembling the constant velocity joint 100, i.e., a process of installing the rolling elements 28 and a holder 146 in the roller 130, will be described below.

As shown in FIG. 5, all (a predetermined number) rolling elements 28 are inserted altogether into the roller 130, i.e., placed onto the inner circumferential wall surface 40, in an axial direction of the inner circumferential wall surface 40, i.e., a direction opposite to the flange 42, using the jig 60 (see FIG. 6). The inner circumferential wall surface 40 is coated with a lubricant such as grease, wax, or the like in advance.

As shown in FIG. 6, a plurality of rolling elements 28 are annularly arrayed and loaded in and along the annular step 68 of the jig 60. When all of the rolling elements 28 (which may, but not necessarily, be 15 rolling elements 28 as shown in FIG. 6) are loaded in the annular step 68, all of the rolling elements 28 may not be kept in a keystone state capable of producing the keystone effect, but should preferably be kept in a keystone state capable of producing the keystone effect, and more preferably be kept in a state wherein the keystone effect is produced.

Then, as shown in FIG. 7, the upper surface of the ring 64 is brought into abutment against the first end face 34 of the roller 130 remote from the flange 42, and while the ring 64 is fixed in place, the cylindrical body 62 is axially lifted to push and insert all of the rolling elements 28 into the roller 130 to place them altogether onto the inner circumferential wall surface 40.

When the cylindrical body 62 is lifted, as shown in FIG. 8, all of the rolling elements 28 are displaced altogether in the axial direction of the inner circumferential wall surface 40, and inserted into the roller 130.

At this time, all of the rolling elements 28 are not pressed under pressing forces, but merely displaced and inserted into the roller 130 along the inner circumferential wall surface 40. The displacement of the rolling elements 28 inserted into the roller 130 is limited when the leading ends of the rolling elements 28 abut against the flange 42.

The rolling elements 28 loaded on the inner circumferential wall surface 40 are kept in the keystone state to produce the keystone effect, and are prevented from being dislodged from the inner circumferential wall surface 40.

Figure 22:
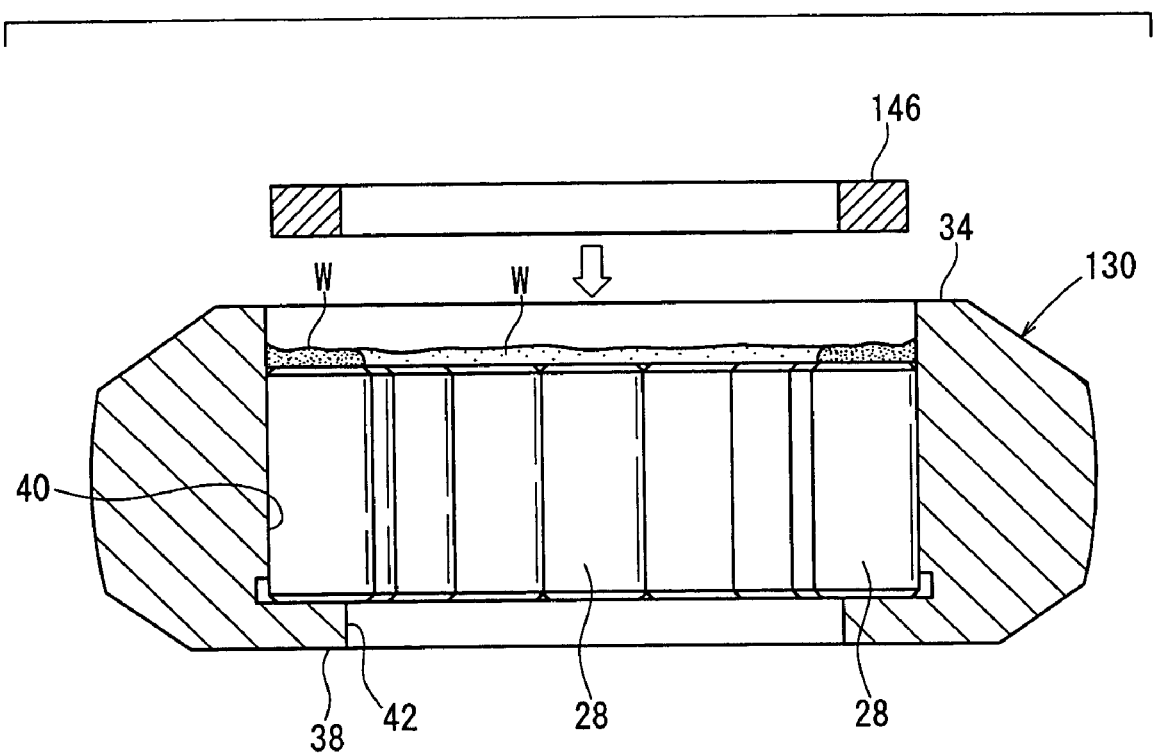
FIG. 22 is a vertical cross-sectional view showing the manner in which after all rolling elements are inserted into the roller, a lubricant such as a wax or the like is supplied to the rolling elements.
Figure 23:
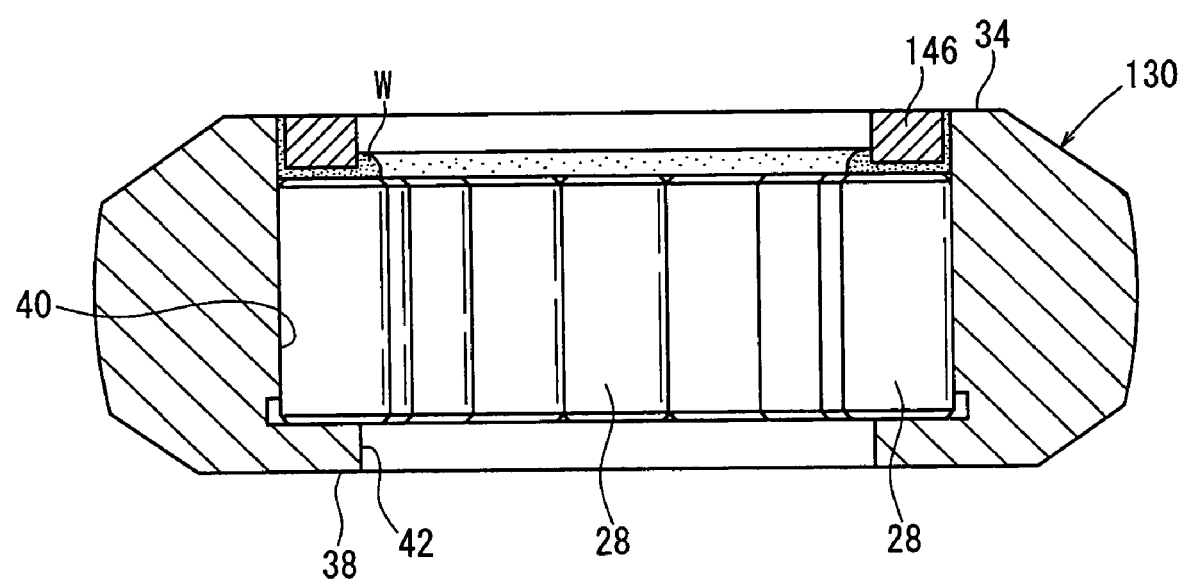
FIG. 23 is a vertical cross-sectional view showing the manner in which a holder inserted into the roller is temporarily secured in place by the lubricant.

After all of the rolling elements 28 are loaded on the inner circumferential wall surface 40, as shown in FIG. 22, the rolling elements 28 whose lower ends are retained in place by the flange 42 are supplied (coated) with a lubricant W such as grease, wax (PASTE WAX or SOLID WAX), or the like. Then, a holder 146 in the form of a flat ring is placed axially onto the inner circumferential wall surface 40 of the roller 130 remotely from the flange 42. The holder 146 is held in close contact with the lubricant W and hence held in engagement with the roller 130, i.e., temporarily secured in place in the roller 130, by the viscosity of the lubricant W. At this time, all of the rolling elements 28 are retained in position between the holder 146 and the flange 42. The holder 146 mounted on the inner circumferential wall surface 40 has an outer surface which is made substantially flush with, or may not project from the first end face 34 of the roller 130.

Figure 24:
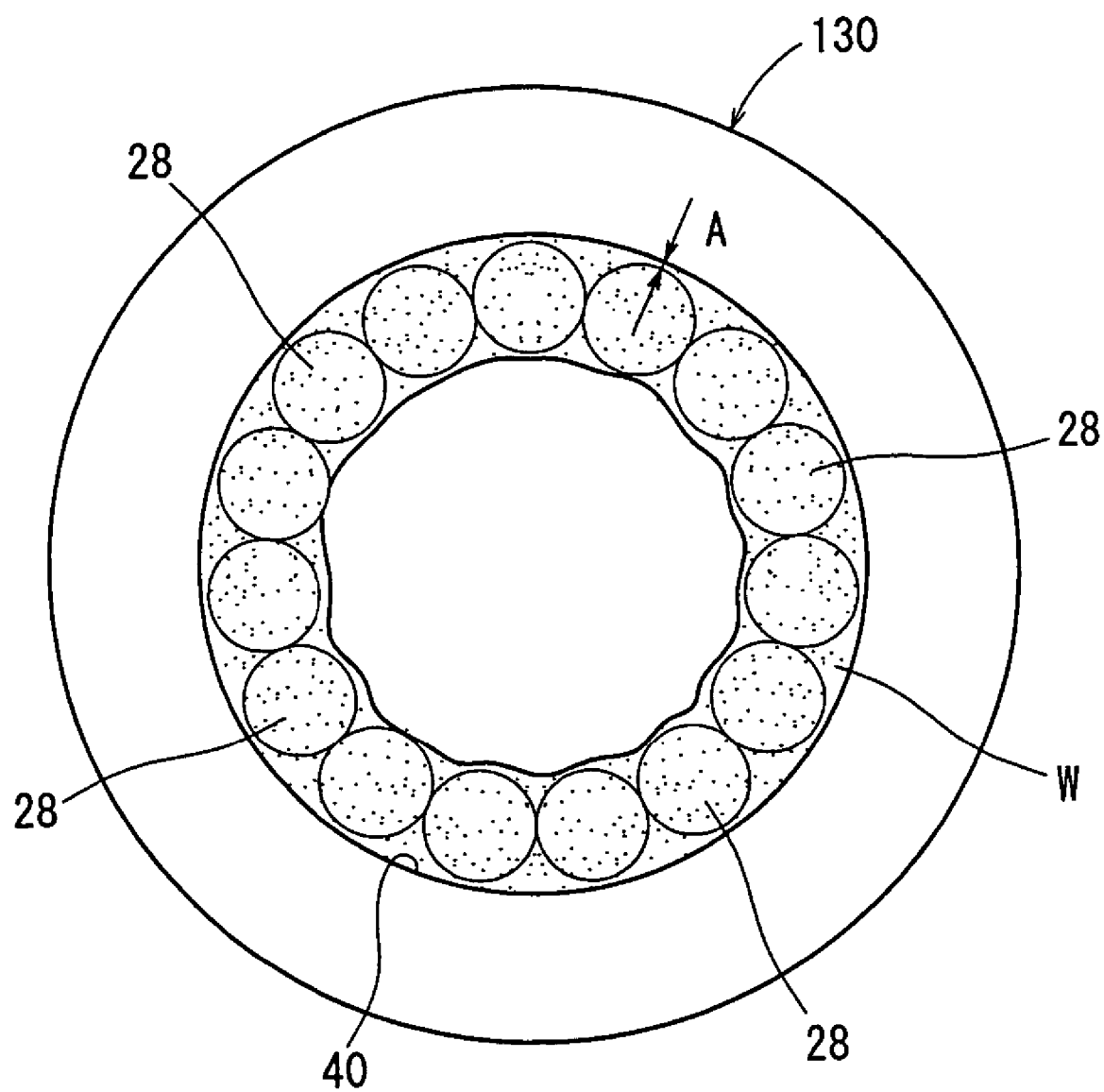
FIG. 24 is a plan view showing the manner in which a radial clearance between an inner circumferential wall surface of the roller and the rolling elements is filled with the lubricant.
Figure 25:
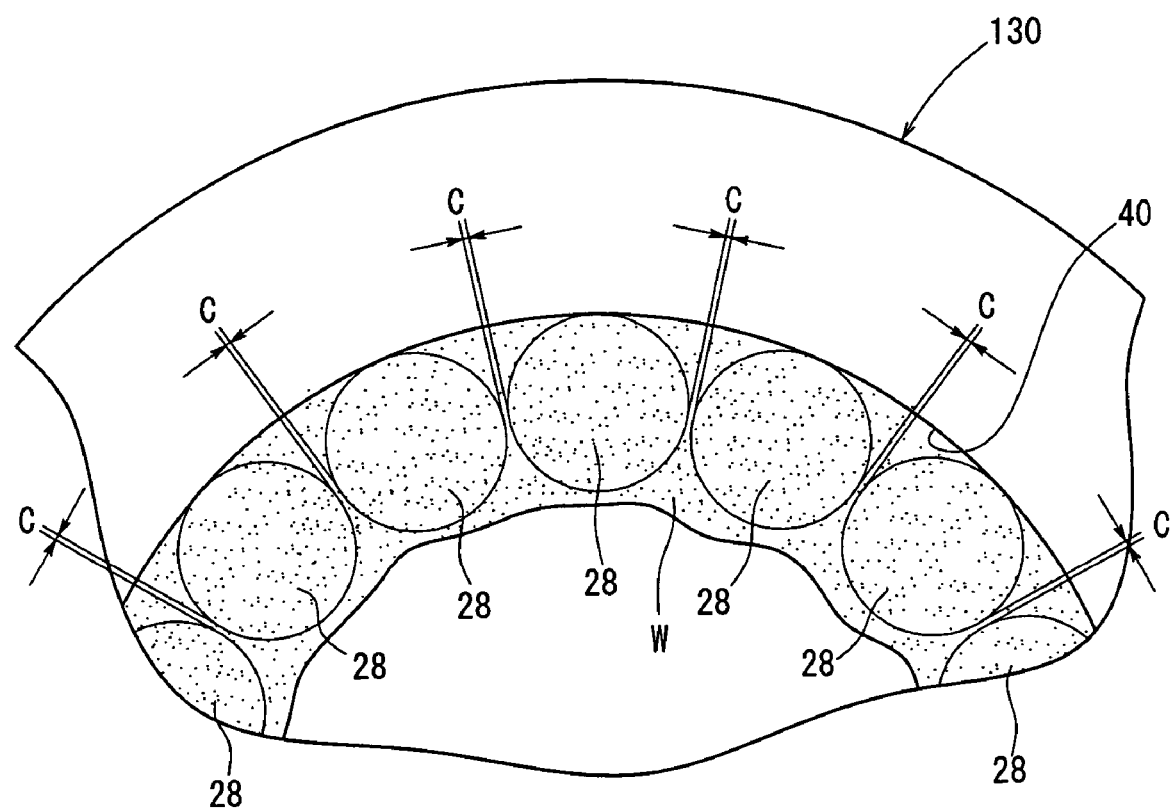
FIG. 25 is an enlarged fragmentary plan view showing the manner in which circumferential clearances between adjacent rolling elements are filled with the lubricant.

The lubricant W applied to the rolling elements 28 may be deposited substantially uniformly to a predetermined thickness on the end faces of the rolling elements 28 on which the holder 146 is mounted. As shown in FIGS. 24 and 25, the lubricant W may be filled in the clearances C between the adjacent rolling elements 28 and the radial clearance C between the rolling elements 28 and the roller 130.

The holder 146 has a diameter smaller than the diameter of the inner circumferential wall surface 40, allowing the lubricant W to be introduced in the clearance between the outer edge of the holder 146 and the inner circumferential wall surface 40. Alternatively, the diameter of the holder 146 may be slightly greater than the diameter of the inner circumferential wall surface 40, and the holder 146 may be press-fitted lightly onto the inner circumferential wall surface 40.

Figure 26:
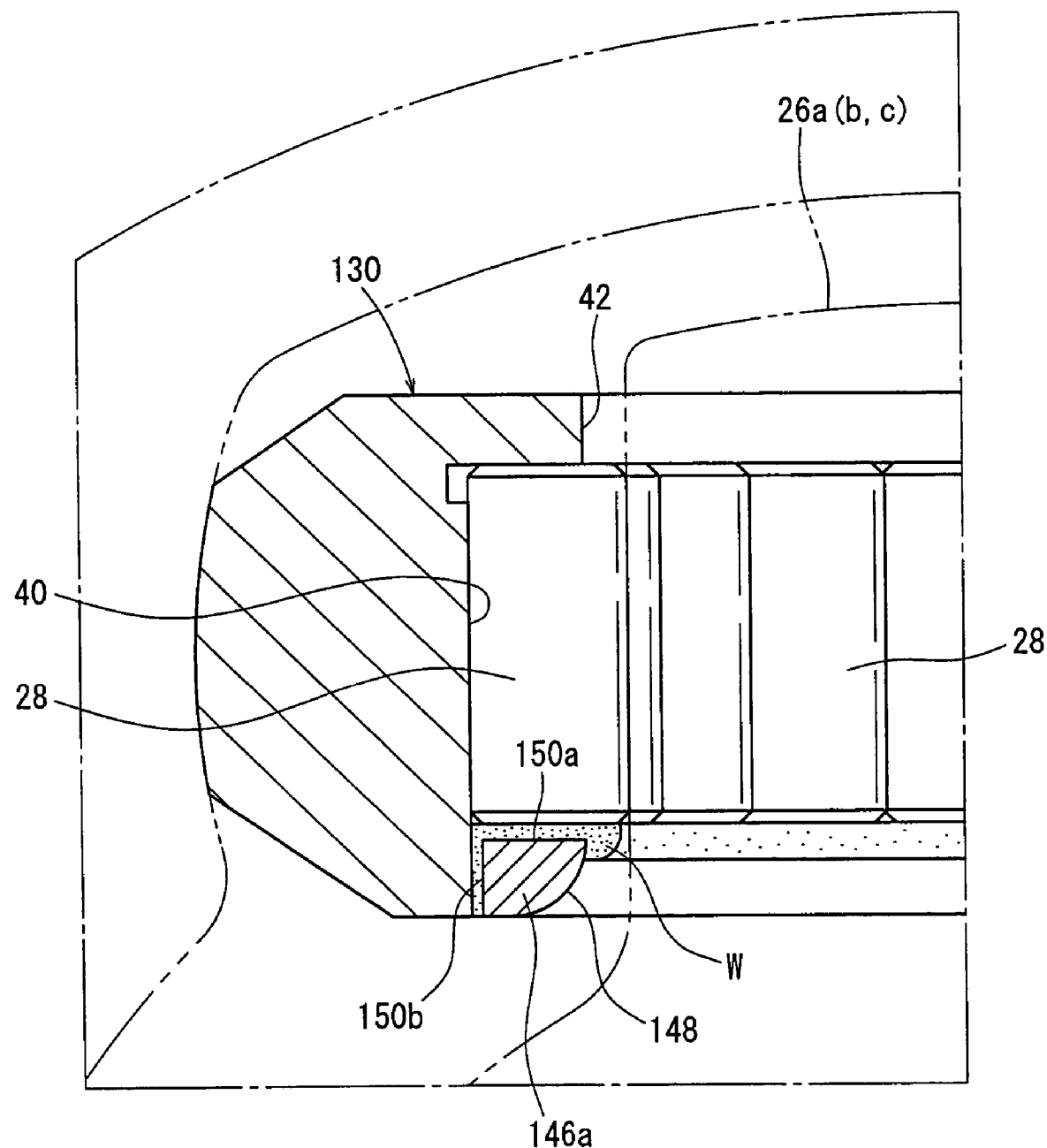
FIG. 26 is an enlarged fragmentary vertical cross-sectional view of a roller assembly wherein another holder having an arcuate surface having an arcuate cross section is mounted on an inner circumferential wall surface thereof.
Figure 27:
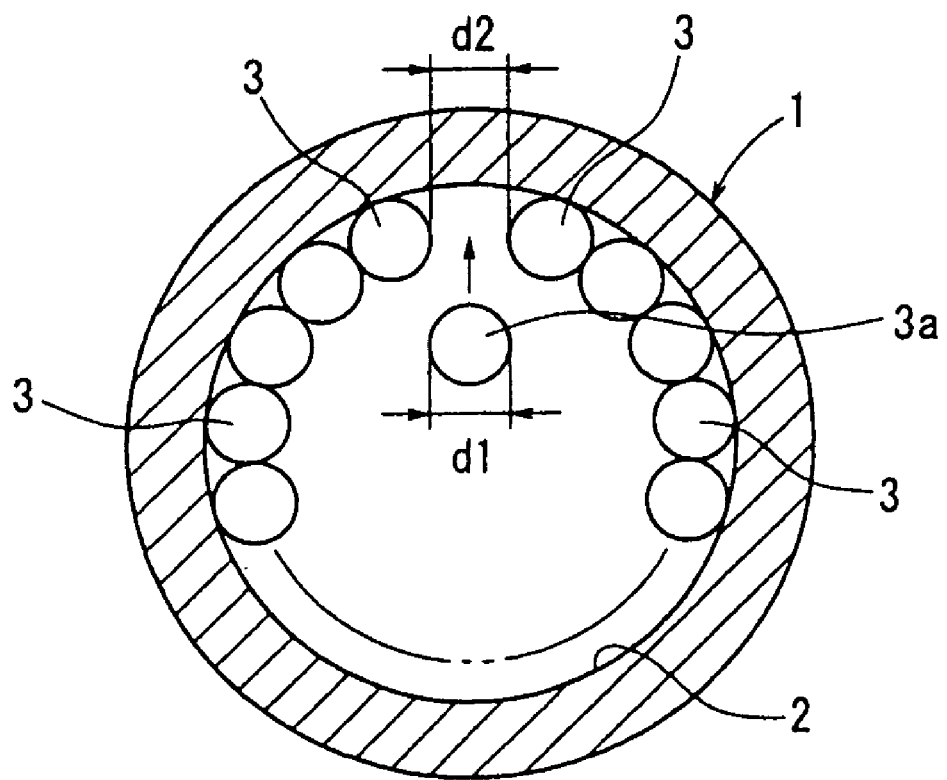
FIG. 27 is a transverse cross-sectional view illustrative of a process of pressing rolling elements onto the cylindrical inner circumferential wall surface of a roller of a conventional constant velocity joint.

The holder 146 is not limited to a flat washer having a rectangular cross-sectional shape. For example, as shown in FIG. 26, the holder 146 may be combined with another holder 146a having an arcuate surface 148 having an arcuate cross section on its inner circumferential side surrounding the trunnion 26a (26b, 26c) and a first annular surface 150a and a second annular surface 150b which are substantially parallel to the end faces of the rolling elements 28 and the inner circumferential wall surface 40, respectively.

Roller assemblies, each comprising a plurality of rolling elements 28 retained on the inner circumferential wall surface 40 of a roller 130, are mounted respectively on the trunnions 26a, 26b, 26c, and then inserted into the outer cup 12 such that the rollers 130 engage in the respective guide grooves 18a, 18b, 18c, thereby constructing the constant velocity joint 100.

According to the third assembling process, since no annular groove needs to be formed in the inner circumferential wall surface 40 of the roller 130, no machining process is required to form such an annular groove. The holder 146 can simply be temporarily secured in place by the lubricant W such as a wax or the like that is supplied to the rolling elements 28. Therefore, the machining cost and the assembling cost are reduced to reduce the overall manufacturing cost.

According to the third assembling process, after all of the rolling elements 28 arrayed in the jig 60 are inserted altogether into the roller 130 in the axial direction of the inner circumferential wall surface 40, the holder 146 is secured in place by the lubricant W such as a wax or the like. Consequently, the rolling elements 28 can be assembled easily and efficiently in the roller 130 for a reduced manufacturing cost without being affected by the outside diameter tolerances of the rolling elements 28 and the inside diameter tolerance of the roller 130.

Stated otherwise, according to the conventional assembling process, since the final rolling element 3a is pressed into the gap radially toward the inner circumferential wall surface 2 of the roller 1 for producing the keystone effect, the tolerances (the inside diameter tolerance of the cylindrical inner circumferential wall surface 2 and the outside diameter tolerances of the rolling elements 3) have to be made as small as possible. According to the third assembling process, however, since all of the rolling elements 28 are inserted altogether into the roller 130 in the axial direction of the inner circumferential wall surface 40 to achieve the keystone state capable of producing the keystone effect, it is not necessary to press in a final rolling element 28.

According to the third assembling process, the outside diameter tolerances of the rolling elements 28 and the inside diameter tolerance of the cylindrical inner circumferential wall surface 40 of the roller 130 can be managed less strictly than the conventional assembling process. Therefore, the rolling elements 28 and the roller 130 can be machined more easily, and the rolling elements 28 can be assembled, i.e., inserted into the roller 130, more easily.

Using the jig 74 (see FIG. 13) having the shutter plate 72 for supporting the rolling elements 28 loaded in the annular space 70 from below to prevent the rolling elements 28 from dropping off, all of the rolling elements 28 may be inserted altogether into the roller 130 from above the roller 130, i.e., in a direction opposite to the direction in which the rolling elements 28 are inserted as described above.

A fourth process of assembling the constant velocity joint 100, i.e., a process of installing the rolling elements 28 and the holder 146 in the roller 130, will be described below.

Using the jig 60, all (a predetermined number) rolling elements 28 are inserted altogether into the roller 130, i.e., placed onto the inner circumferential wall surface 40, in an axial direction of the inner circumferential wall surface 40, i.e., a direction opposite to the flange 42.

As shown in FIG. 14, all of the rolling elements 28, excluding one, are loaded as an annular array in and along the annular step 68 in the jig 60, creating the gap 69 where the excluded rolling element 28a is to be finally inserted. When all of the rolling elements 28, excluding one, are loaded in the annular step 68, those rolling elements 28 are not kept in the keystone state capable of producing the keystone effect.

Then, as shown in FIG. 7, the upper surface of the ring 64 is brought into abutment against the first end face 34 of the roller 30 remote from the flange 42, and while the ring 64 is fixed in place, the cylindrical body 62 is axially lifted to push and insert all of the rolling elements 28 excluding one into the roller 130 to place them altogether onto the inner circumferential wall surface 40.

Then, as shown in FIG. 15, the excluded rolling element 28a is finally inserted into the gap 69 between two of the rolling elements 28 arrayed on the inner circumferential wall surface 40, in the axial direction (vertical direction) of the inner circumferential wall surface 40.

The final rolling element 28a is not pressed under pressing forces, but merely displaced and inserted into the gap 69 along the inner circumferential wall surface 40. The displacement of the final rolling element 28a inserted into the gap 69 is limited when the leading end of the final rolling element 28a abuts against the flange 42.

After all of the rolling elements 28 are loaded on the inner circumferential wall surface 40, the rolling elements 28 arranged in an annular pattern are supplied (coated) with the lubricant W such as a wax or the like. Then, the holder 146 in the form of a flat ring is placed onto the inner circumferential wall surface 40 of the roller 130 remotely from the flange 42. The holder 146 is now held in place by the viscosity of the lubricant W. At this time, all of the rolling elements 28 are retained in position between the holder 146 and the flange 42.

All of the rolling elements 28 loaded on the inner circumferential wall surface 40 of the roller 130 are kept in the keystone state to produce the keystone effect, which locks the rolling elements 28 in place against the inner circumferential wall surface 40.

All of the rolling elements 28, excluding one, may not be loaded altogether, but, as shown in FIG. 17, may be loaded successively in the axial direction (vertical direction) of the inner circumferential wall surface 40 of the roller 30.

The invention claimed is:

1. A tripod constant velocity joint comprising:
   a tubular outer member for connection to a transmission shaft, said tubular outer member having a plurality of guide grooves defined in an inner wall surface thereof that are spaced from each other and extend in an axial direction of the tubular outer member;
   an inner member for connection to another transmission shaft, said inner member being disposed in an opening defined in said tubular outer member;
   said inner member having a plurality of trunnions projecting respectively into said guide grooves;
   a ring-shaped roller fitted over each of said trunnions and held in contact with surfaces defining said guide grooves;
   a plurality of rolling elements rollingly interposed between each of said trunnions and said roller, said roller having an inner circumferential wall surface;
   a one-sided flange projecting radially from an axial end of said inner circumferential wall surface; and
   a holder mounted in an opposite axial end of said inner circumferential wall surface and holding said rolling elements, wherein before said holder is mounted in said roller,
   said roller is configured to receive simultaneously all rolling elements configured as an annular array,
   all of the rolling elements are configured to be placed onto said inner circumferential wall surface in an axial direction of said inner circumferential wall surface, which is a direction opposite to said one-sided flange, and the rolling elements are retained in place.

2. A constant velocity joint according to claim 1, wherein all of said rolling elements that are inserted into said roller are held in a keystone state on said inner circumferential wall surface.

3. A constant velocity joint according to claim 1, wherein a radial clearance is defined between said inner circumferential wall surface of said roller and outer circumferential surfaces of said rolling elements.

4. A constant velocity joint according to claim 3, wherein said radial clearance is in a range from several μm to several tens of μm.

5. A constant velocity joint according to claim 1, wherein said holder comprises at least a circlip or a washer.

6. A constant velocity joint according to claim 1, wherein said one-sided flange comprises a flange integrally formed with said roller.

7. A constant velocity joint according to claim 1, wherein said one-sided flange is provided by a holder comprising at least a circlip or a washer.

8. A method of manufacturing a constant velocity joint having a tubular outer member having a plurality of guide grooves defined in an inner wall surface thereof that are spaced from each other and extend in an axial direction of the tubular outer member, a plurality of trunnions disposed in an opening defined in said tubular outer member and projecting respectively into said guide grooves, a ring-shaped roller fitted over each of said trunnions and held in contact with surfaces defining said guide grooves, a plurality of rolling elements rollingly interposed between each of said trunnions and said roller, said roller having an inner circumferential wall surface, a one-sided flange projecting radially from an axial end of said inner circumferential wall surface, and a holder mounted in an opposite axial end of said inner circumferential wall surface and holding said rolling elements, said method comprising:
   before said holder is mounted in said roller,
      configuring all rolling elements as an annular array,
      simultaneously inserting all of the rolling elements into said roller, in an axial direction of said inner circumferential wall surface, which is a direction opposite to said one-sided flange,
      placing all of the rolling elements onto said inner circumferential wall surface with a radial clearance defined between said inner circumferential wall surface and outer circumferential surfaces of said rolling elements; and
   after said all rolling elements are inserted altogether into said roller, installing said holder to hold said rolling elements on the opposite axial end of said inner circumferential wall surface of said roller.

* * * * *